United States Patent
Lynch et al.

(10) Patent No.: US 11,348,576 B1
(45) Date of Patent: May 31, 2022

(54) UNIVERSAL AND USER-SPECIFIC COMMAND PROCESSING

(71) Applicant: Amazon Technologies, Inc., Seattle, WA (US)

(72) Inventors: Bradford Lynch, Seattle, WA (US); Adam D. Baran, Redmond, WA (US); Kevindra Pal Singh, Seattle, WA (US); Udai Sen Mody, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/833,534

(22) Filed: Dec. 6, 2017

(51) Int. Cl.
| G10L 15/22 | (2006.01) |
| G10L 13/00 | (2006.01) |
| G10L 15/06 | (2013.01) |
| G10L 15/30 | (2013.01) |
| G10L 15/24 | (2013.01) |
| G10L 15/18 | (2013.01) |
| G10L 17/00 | (2013.01) |

(52) U.S. Cl.
CPC .............. *G10L 15/22* (2013.01); *G10L 13/00* (2013.01); *G10L 15/063* (2013.01); *G10L 15/1815* (2013.01); *G10L 15/24* (2013.01); *G10L 15/30* (2013.01); *G10L 17/00* (2013.01); *G10L 2015/0635* (2013.01); *G10L 2015/223* (2013.01)

(58) Field of Classification Search
CPC ... G10L 15/22; G10L 15/063; G10L 15/1815; G10L 15/24; G10L 15/30; G10L 13/00; G10L 17/005; G10L 2015/0635; G10L 2015/223; G10L 17/00
See application file for complete search history.

(56) References Cited

U.S. PATENT DOCUMENTS

| 10,475,451 | B1* | 11/2019 | Lynch | G10L 15/1815 |
| 10,546,584 | B2* | 1/2020 | Bilgory | G10L 15/02 |
| 2017/0169811 | A1* | 6/2017 | Sabbavarapu | G10L 13/08 |
| 2017/0300831 | A1* | 10/2017 | Gelfenbeyn | G06N 3/004 |
| 2018/0268812 | A1* | 9/2018 | Kim | G10L 15/26 |
| 2019/0012198 | A1* | 1/2019 | Ni | G06F 9/4843 |
| 2019/0066689 | A1* | 2/2019 | Je | G10L 15/22 |

OTHER PUBLICATIONS

Sievering, "Semantic approach in the information systems," IEEE International Conference on Industrial Informatics, 2003. INDIN 2003. Proceedings., Banff, Alberta, Canada, 2003, pp. 89-95. (Year: 2003).*

* cited by examiner

*Primary Examiner* — Michelle M Koeth
(74) *Attorney, Agent, or Firm* — Pierce Atwood LLP

(57) ABSTRACT

A system configured to process an incoming spoken utterance and to coordinate among multiple speechlet components to execute an action of the utterance, where a trained model considers user history and preference information to select the primary speechlet to execute the action as well as any intermediate speechlets that may be provide input data to the speechlet that will ultimately perform the action. The trained model may also consider current dialog information, feedback data, or other data when determining how to process a dialog.

20 Claims, 17 Drawing Sheets

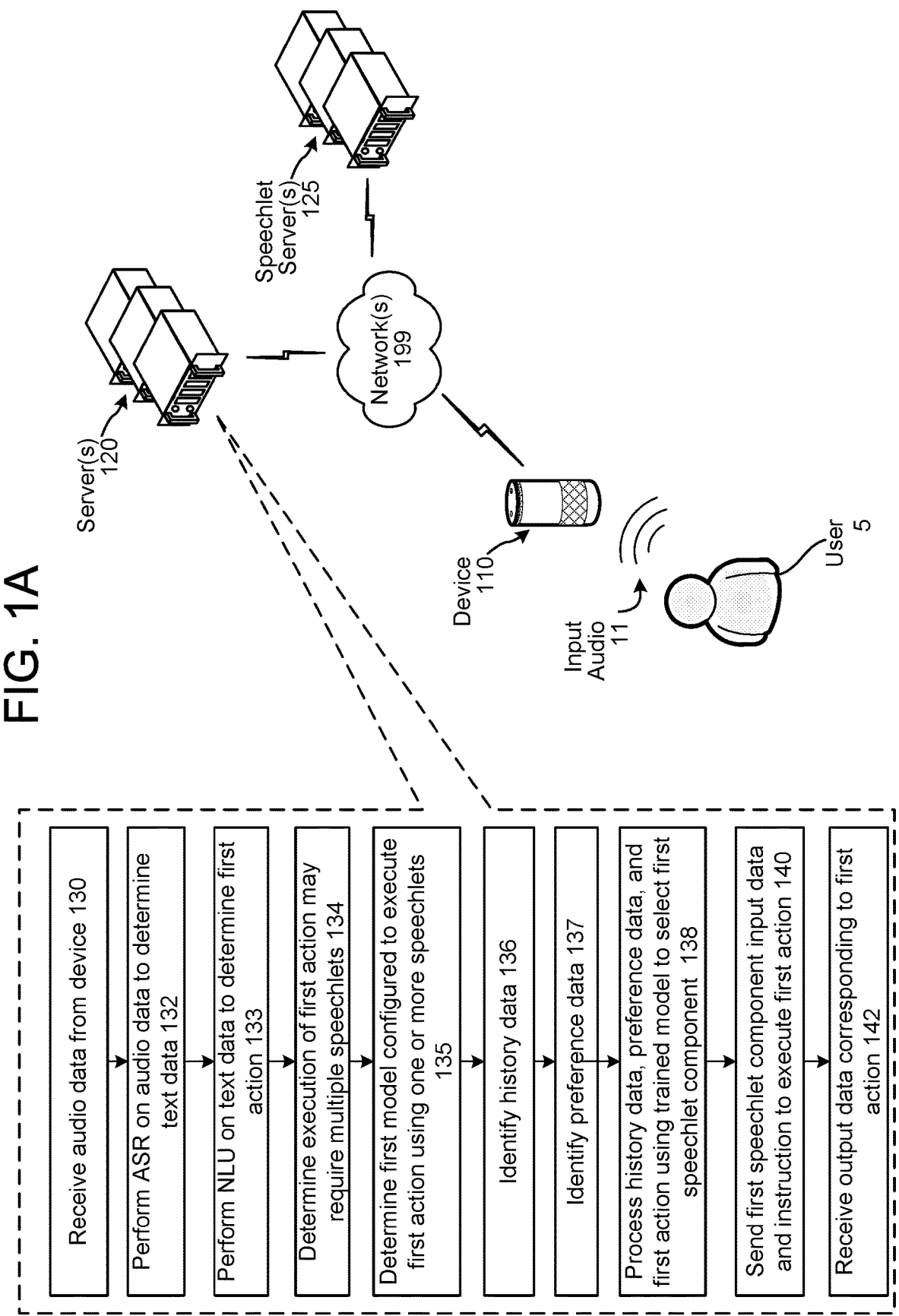

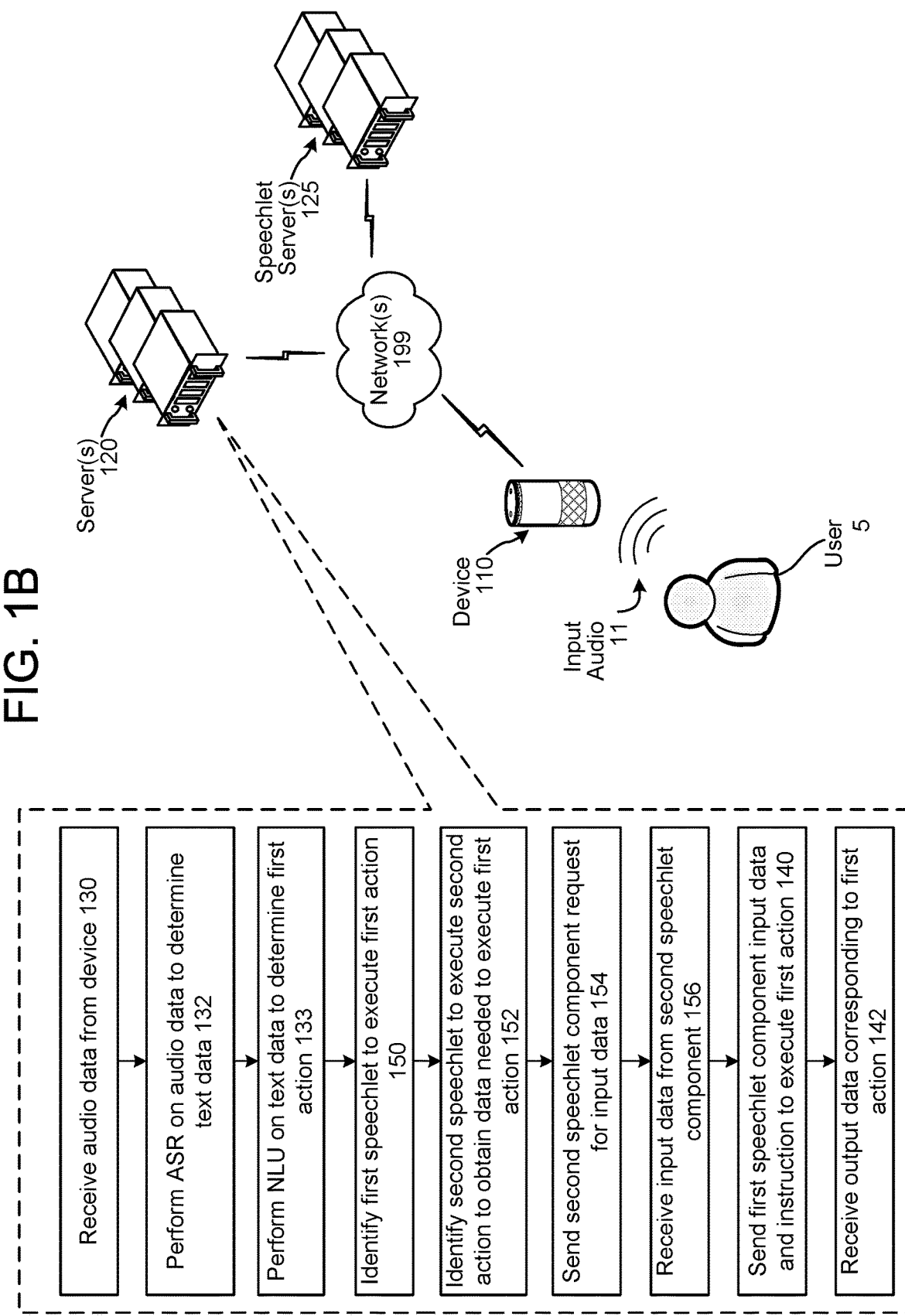

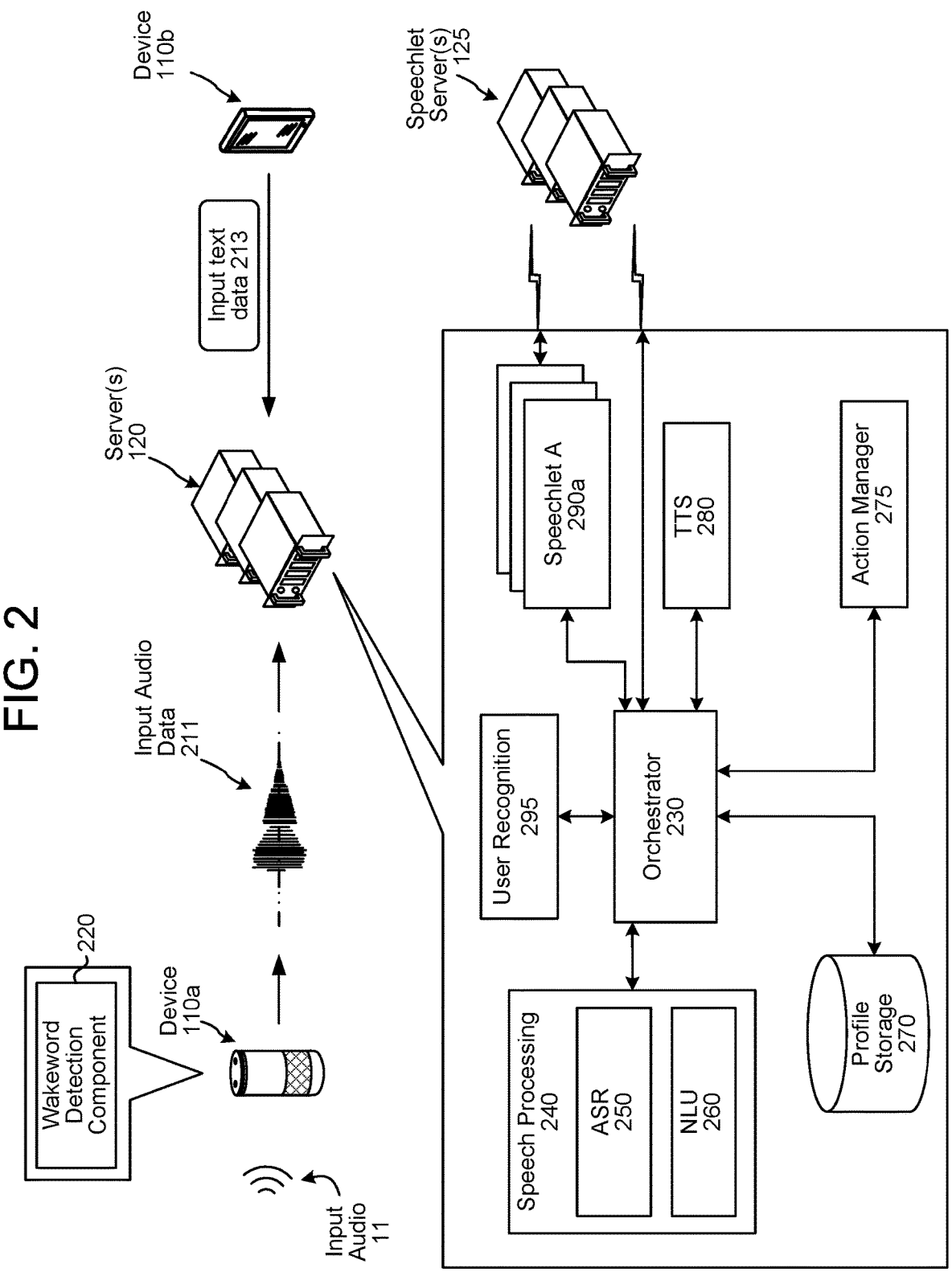

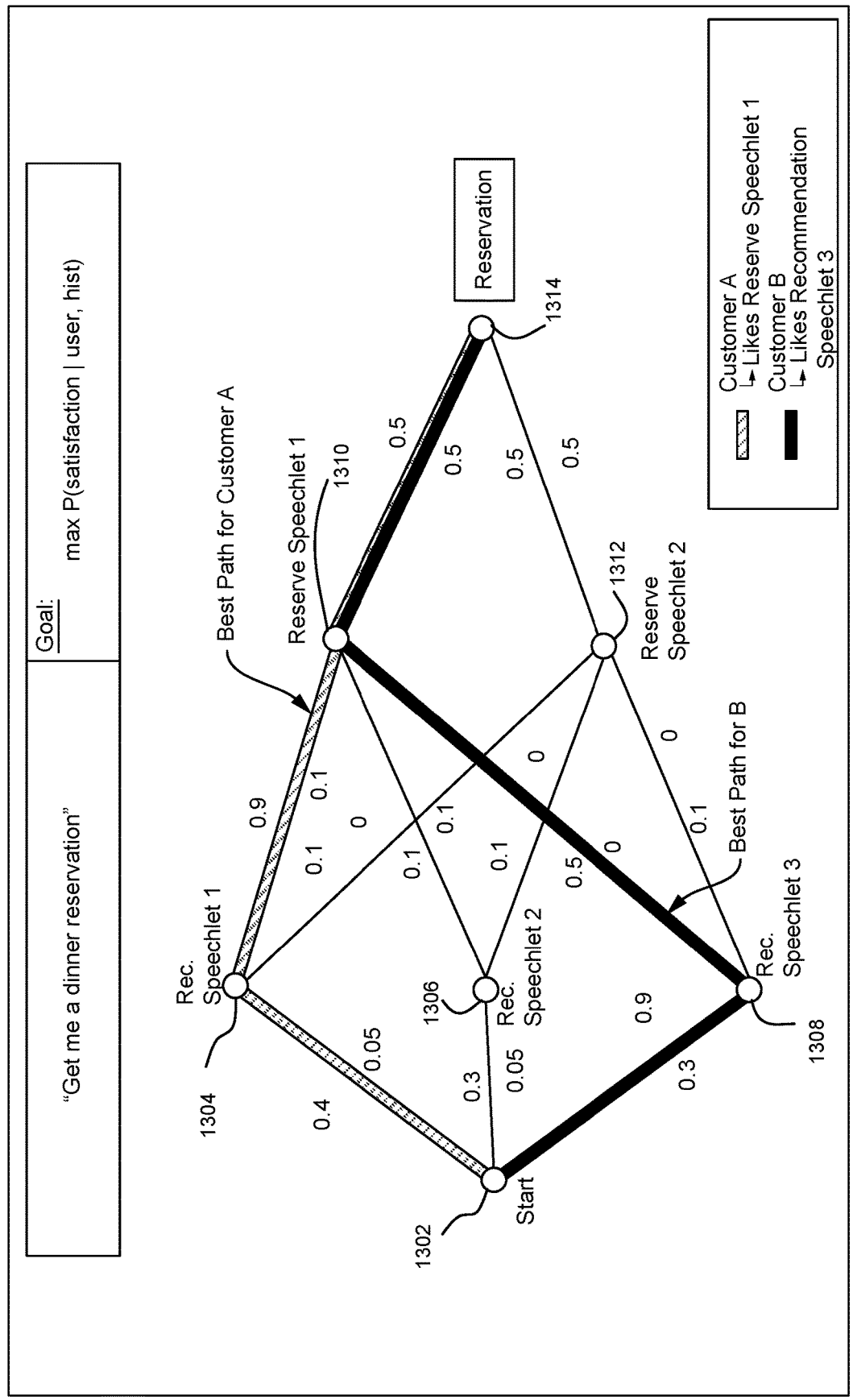

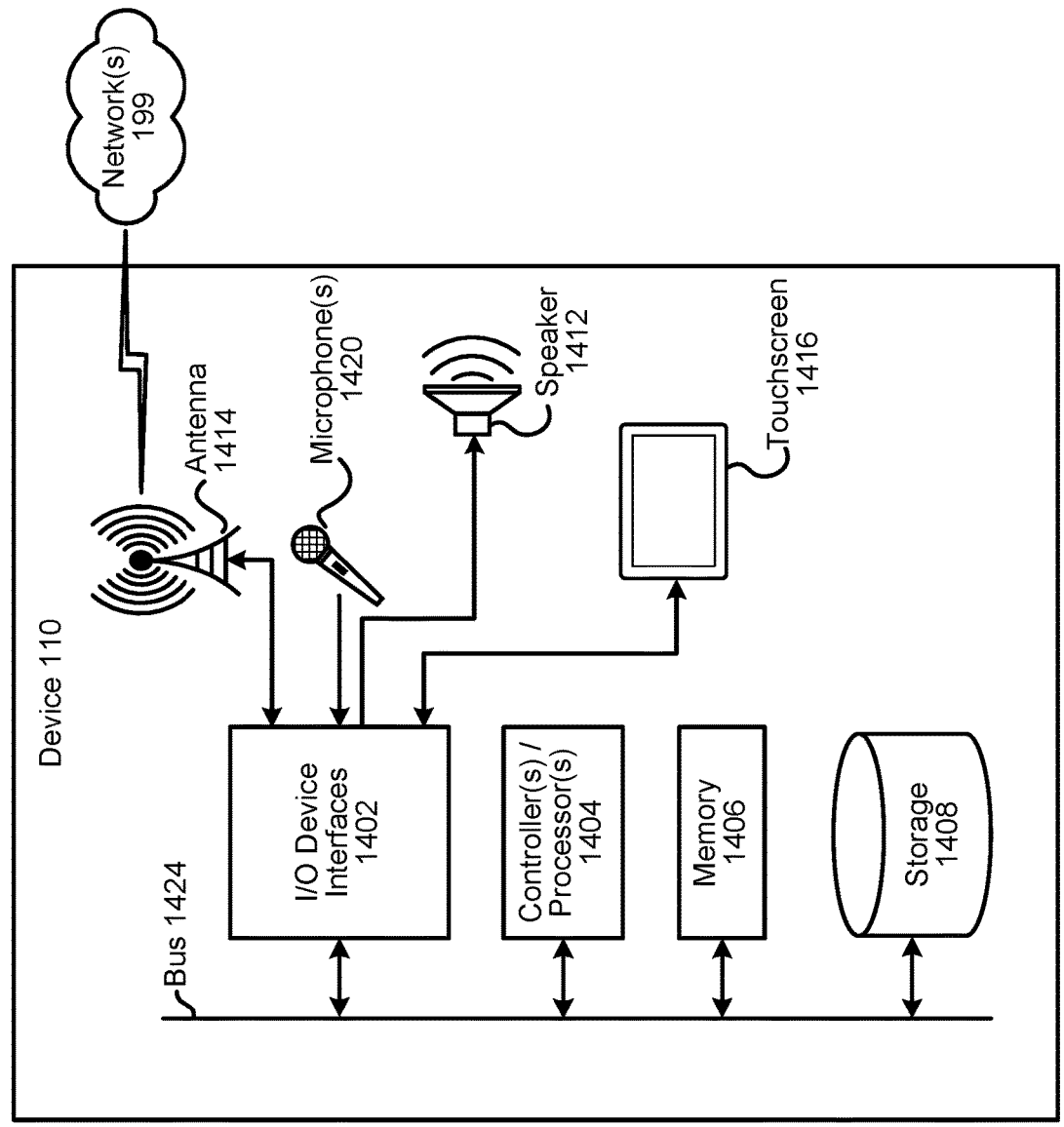

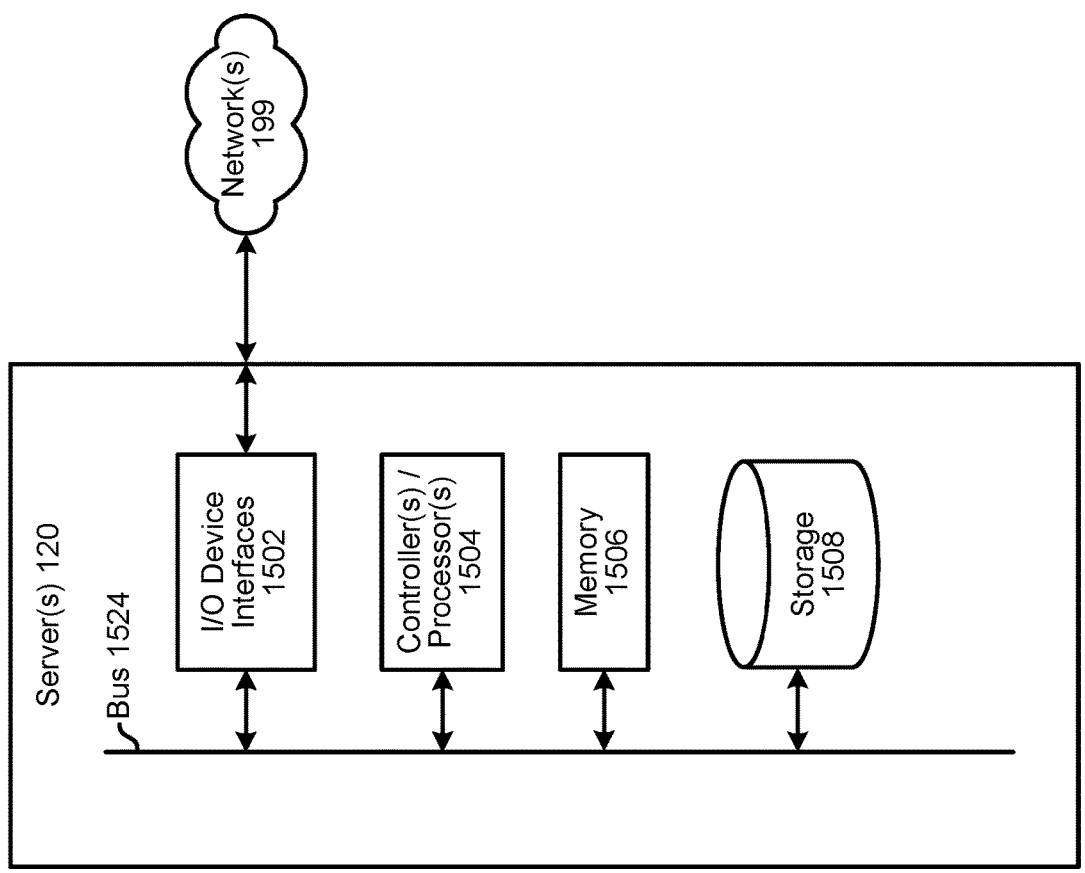

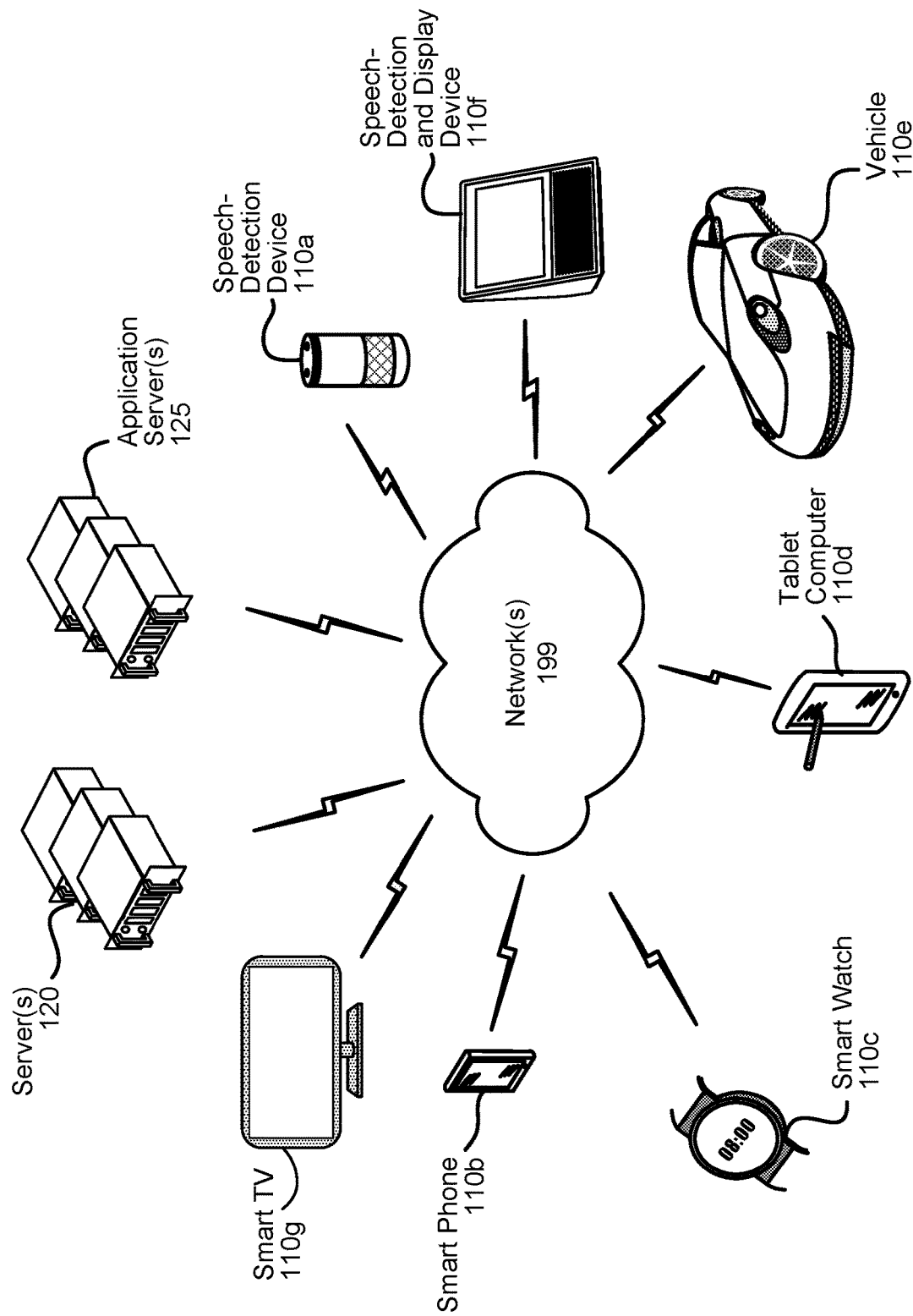

UNIVERSAL AND USER-SPECIFIC COMMAND PROCESSING

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A illustrates a system for using multiple speechlets to execute a speech command for a particular user according to embodiments of the present disclosure.

FIG. 1B illustrates a system for using multiple speechlets to execute a speech command according to embodiments of the present disclosure.

FIG. 2 is a conceptual diagram of components of a system according to embodiments of the present disclosure.

FIG. 13 illustrates how a speech processing system may select different speechlets to execute the same command for different users depending on user data such as user preference data according to embodiments of the present disclosure.

FIG. 14 is a block diagram conceptually illustrating example components of a device according to embodiments of the present disclosure.

FIG. 15 is a block diagram conceptually illustrating example components of a server according to embodiments of the present disclosure.

FIG. 16 illustrates an example of a computer network for use with the speech processing system.

DETAILED DESCRIPTION

Figure 3:
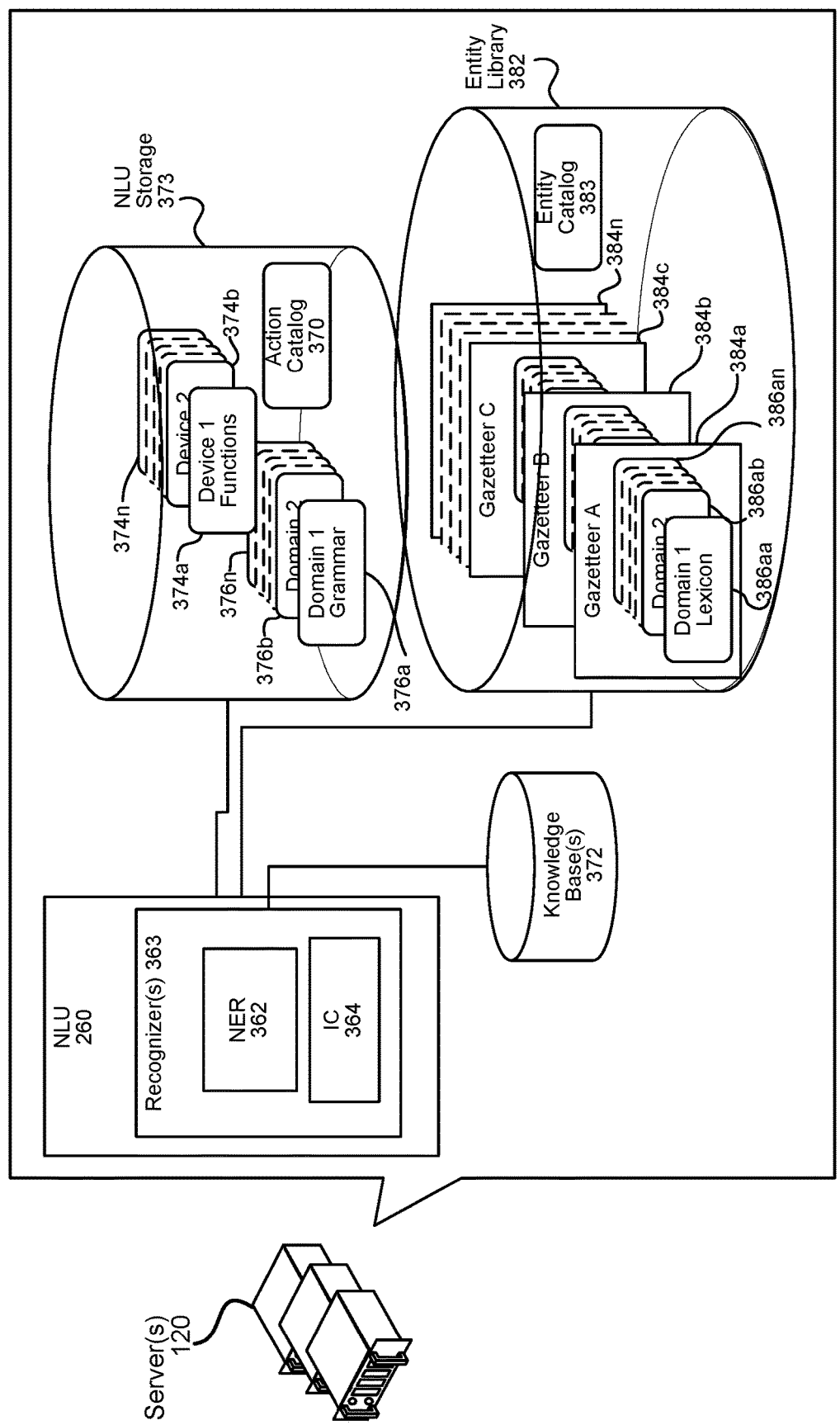
FIG. 3 is a conceptual diagram of how natural language processing is performed according to embodiments of the present disclosure.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. Text-to-speech (TTS) is a field of computer science, artificial intelligence, and linguistics concerned with enabling computers to output synthesized speech. ASR, NLU, and TTS may be used together as part of a speech processing system.

A speech controlled computing system may answer user commands requesting the output of content. For example, a user may say "Alexa, what is the weather." In response, the system may output weather information. For further example, a user may say "Alexa, play Adele." In response, the system may output music sang by Adele.

A generalized speech processing system may be configured to perform many different actions such as outputting media, controlling home devices, making reservations, ordering products, obtaining reviews, playing games, etc. It is a non-trivial task to configure a system to accurately capture audio data for general utterances, be able to process the audio data to determine the user's intent, identify an appropriate executable action for that intent, and select the appropriate component for handling that action to ultimately correctly execute the user's intent and obtain the desired result, in a relatively short amount of time (e.g., a few seconds or less) from when the user starts speaking to a device in communication with or otherwise comprised in the system.

Certain speech processing systems perform NLU to derive a list of intents that potentially relate to an input user command. An intent corresponds to what the user desires a system to do in response to the utterance. During NLU processing the system processes the text of the user command to determine one or more intents that may correspond to the user utterance. The intent may be represented by a particular action that the system (either alone or in conjunction with other components) can perform. For example, a system may determine an input command of "Play Adele" potentially relates to a <PlayMusic> action and a <PlayVideo> action, since the command may correspond to a request to play Adele music or a request to play an Adele music video.

There are many types of utterances that a user may pose to the system from simple single-fact queries (for example, "what is the capital of France?") to more detailed queries involving time, place, multiple entities, etc. (for example, "when was Tom Cruise married to Nicole Kidman?"). Further, the utterance may include a command that may range in specificity/complexity, for example one command may be "set a timer for 5 minutes" where another may be "play the latest album by the foo fighters." Different utterances may involve different intents. Each particular utterances may then be associated with one or more actions that component(s) of the system can execute to perform the command. The utterance may result in the system (or some downstream component or device in communication with the system) taking some action, creating (and potentially sending) some output data or other different operations that fulfill the user's request. In the examples above the utterances correspond to actions of determining a capital of a country, determining a date when two individuals were married, setting a timer, and playing music. Different actions may also involve different entities. An entity is a person, place, thing, etc. that has an identity. In order to perform the action indicated by the utterance the system must be able to identify the entity (or entities) in the utterance. In the examples above the entities involved are France, Tom Cruise, Nicole Kidman, Foo Fighters, and their latest album.

The process of identifying the intent of an utterance (which may be part of NLU) may be referred to as intent/command classification. The process of identifying an entity in an utterance (which also may be part of NLU) may involve a two stage processes where the first stage is entity recognition and the second stage is entity resolution, actually matches the text of the entity to a specific entity known to the system. The first stage, entity recognition, involves identifying a mention of an entity in text. This includes identifying particular text portion within the query text that corresponds to the entity. This particular text portion is sometimes called a "slot." As can be appreciated, different entities may share a name even if they are different entities and are understood by the system to be unique and distinct from each other. For example, "Madonna" may refer to either the musical artist, the religious figure, or even to a specific work of art. The second stage of identifying an entity, called entity resolution, actually determines the precise entity that corresponds to the particular text of the slot. As can be appreciated, natural language understanding involves a complex analysis of text (which may be obtained either from a spoken utterance or from some other source) and potentially other data to determine the text's precise meaning.

Certain speech processing systems may divide their capabilities into "domains," where each domain represents a certain subject area for a system. For example a system may have a music domain, a video domain, a reservation domain, weather domain, shopping domain, or the like. Domain-specific processing may be configured such that an incoming utterance may be processed in parallel by each domain and the potential speech processing results of each domain compared against each other, with the most likely result (e.g., the highest scoring result) being selected to execute on behalf of the user.

Certain speech processing systems may configure speech processing to allow each domain to construct its own catalog of actions the system may execute that correspond to user intents that are processable by the domain. For example a music domain may use a catalog of actions such as <PlaySong>, <PlayAlbum>, <Pause>, or the like, while a reservation domain may use a catalog of actions such as <MakeReservation>, <ConfirmReservation>, <CancelReservation>, or the like. Each domain may also have its own catalog of entities that it may use in executing actions. For example, a music domain may use a catalog of music, a reservation domain may have a catalog of restaurants, etc.

Thus, each domain may be configured with its own intents/commands, slot structure, entities, knowledge base, or the like. To configure a system to handle a new domain, intents, slots and other items used for speech processing may need to be specially designed, configured, and tested for each new domain. This can lead to significant resource expenditures, even for domains that may be similar or have overlapping subject matter. For example, a domain for playing music may be similar to a domain for playing a movie, and may involve many of the same entities (such as musicians who are also actors). Similarly, a shopping domain may overlap a number of different domains (for example music, where an album may be the subject of a play music intent as well as a purchase album intent). Present NLU systems may need to be trained separately to recognize a play music intent for a specific album as well as being trained separately to recognize a purchase album intent for the same album.

Further, during runtime, existing speech processing systems may process a single utterance using multiple domains at the same time. As the system may not know what domain the utterance belongs in until the speech processing is complete, the system may process text of an utterance substantially simultaneously using models for books, video, music, etc. The results of that processing may be ranked, with the highest ranking results being executed/returned to the user. Such parallel domain processing can waste significant computing resources at runtime, in addition to the resources expended configuring the system to operate across multiple domains.

Offered is a natural language processing system that incorporates a universal catalog of actions that may be executable by different components of the system. To navigate execution of these actions, the system may incorporate an action manager that understands the actions, what speechlets can execute the actions, what input data a particular speechlet needs to execute the action and what output data a speechlet outputs for the action. The system, using the action manager may determine the best way to satisfy a particular user intent, even activating multiple intermediate speechlets to obtain the data needed to execute the particular action corresponding to the intent. Further, the action manager may use user-specific data such as user history, user preferences, etc. to determine the best way to implement the action corresponding to the user's intent. The action manager may use a trained machine-learning model to process the various data and to ultimately execute the intended action of the utterance.

FIG. 1A illustrates a system for using multiple speechlets to execute a speech command for a particular user according to embodiments of the present disclosure. Although the figures and discussion illustrate certain operational steps of the system in a particular order, the steps described may be performed in a different order (as well as certain steps removed or added) without departing from the intent of the disclosure. Device 110 local to a user 5, one or more server(s) 120, and one or more speechlet servers 125 may communicate across one or more networks 199. The speechlet server(s) 125 may each correspond to a particular speechlet 290 (described below) and may be capable of performing operations to ultimately execute an action.

During a runtime operation (such as when a user utterance/command is received by the system), a device 110 may detect input audio 11 corresponding to a spoken utterance originating from the user 5. The device 110 generates input audio data 211 corresponding to the input audio 11 and sends the input audio data 211 to the server(s) 120. The server(s) 120 receives (130) the input audio data 211 from the device 110 and performs (132) ASR on the input audio data to generate text data.

Alternatively, a device may receive input from the user 5 corresponding to text via a touch screen providing a virtual keyboard. The device may generate input text data corresponding to the input text. The device may send the input text data to the server(s) 120 via an application operating on the device and in communication with the server(s) 120.

The server(s) 120 performs (133) NLU on input text data (i.e., received from the device or generated by ASR processing on input audio data 211 received from the device 110) to generate NLU results data indicating a requested first action. The server(s) 120 may then determine (134) that execution of the first action may require invocation of multiple speechlets. The system then determines (135) that a first model is configured to execute the first action using one or more speechlets. This may involve determining that the first action is registered as an action that can be managed by an action manager 275 operating the trained model discussed below. The server(s) 120 also determines context data representing a current context of the system and/or user. For example, the context data may include information corresponding to a time of day, a location of the device, a type of the device, ID of the user, etc. As part of the context data the server(s) 120 may identify (136) history data and may identify (137) preference data associated with a particular user or user profile of the device 110 and/or utterance.

The server(s) 120 may then process (138) the history data, preference data and first action using a trained model to select a first speechlet component capable of performing the first action. The first speechlet may be one of many different speechlets capable of performing the first action, but may be selected by the server due to history data, preference data, or the like associated with the particular user speaking the utterance.

The server(s) 120 may then send (140) the first speechlet component an instruction to execute the first action along with the input data needed by the first speechlet component to execute the first action. As discussed below, the server(s) 120, through an action manager 275 or other component, may also communicate with other speechlet components to obtain the data needed by the first speechlet component to execute the first action.

The server(s) 120 may then receive (142), from the first speechlet component, output data corresponding to the first action and may then send that output data to the device 110.

FIG. 1B illustrates a system for using multiple speechlets to execute a speech command according to embodiments of the present disclosure. During a runtime operation (such as when a user utterance/command is received by the system), a device 110 may detect input audio 11 corresponding to a spoken utterance originating from the user 5. The device 110 generates input audio data 211 corresponding to the input audio 11 and sends the input audio data 211 to the server(s) 120. The server(s) 120 receives (130) the input audio data 211 from the device 110 and performs (132) ASR on the input audio data to generate text data.

Alternatively, a device may receive input from the user 5 corresponding to text via a touch screen providing a virtual keyboard. The device may generate input text data corresponding to the input text. The device may send the input text data to the server(s) 120 via an application operating on the device and in communication with the server(s) 120.

The server(s) 120 performs (133) NLU on input text data (i.e., received from the device or generated by ASR processing on input audio data 211 received from the device 110) to generate NLU results data indicating a first action. The server(s) 120 also determines context data representing a current context of the system and/or user. For example, the context data may include information corresponding to a time of day, a location of the device, a type of the device, ID of the user, etc.

The server(s) 120 may identify (150) a first speechlet to execute the first action. This identification may use an action manager, a trained model (such as one operated by the action manager) or some other component/technique to identify the first speechlet. The server(s) 120 may also determine a first type of data and/or second (or more) types of data needed by the first speechlet component to execute the first action. The server(s) 120 may then identify (152) a second speechlet component that can execute a second action to output the first type of data needed by the first speechlet component to execute the first action. The server may identify the second speechlet component even if the second action was never mentioned in the utterance or otherwise called for by the user's real-time input. The action manager, or other component, may use internal processes to determine the data needed to execute the first action and may thus engage the second speechlet component to get that data. The server(s) 120 may thus send (154) the second speechlet component a request for the input data (which may include an instruction to execute the second action as well as whatever data the second speechlet needs to execute the second action). The second speechlet component may then execute the second action and send the input data. The server(s) 120 may receive (156) the data from the second speechlet component (which is referred to here as the input data as it is needed for the first action) and then send (140) that input data to the first speechlet component along with an instruction to execute the first action. The server(s) 120 may then receive (142), from the first speechlet component, output data corresponding to the first action and may then send that output data to the device 110.

Further details of the system are described below. The system may operate using various components as described in FIG. 2. The various components may be located on a same or different physical devices. Communication between various components may occur directly or across a network(s) 199.

A speech-capture device 110*a* (e.g., a device that is capable of detecting a user's speech and converting the audio 11 of the speech into audio data 211) may receive input audio 11, corresponding to a spoken utterance corresponding at least in part to a command, using an audio capture component, such as a microphone or array of microphones. The device 110, using a wakeword detection component 220, processes input audio data corresponding to the input audio 11 to determine if a keyword (e.g., a wakeword) is detected in the input audio data. Following detection of a wakeword, the device 110 sends input audio data 211, corresponding to the utterance, to the server(s) 120.

Upon receipt by the server(s) 120, the input audio data 211 may be sent to an orchestrator component 230. The orchestrator component 230 may include memory and logic that enables the orchestrator component 230 to transmit various pieces and forms of data to various components of the system.

The orchestrator component 230 sends the input audio data 211 to a speech processing component 240. An ASR component 250 of the speech processing component 240 transcribes the input audio data 211 into input text data representing one more hypotheses representing speech contained in the input audio data 211. The ASR component 250 interprets the utterance in the input audio data 211 based on a similarity between the utterance and pre-established language models. For example, the ASR component 250 may compare the input audio data 211 with models for sounds (e.g., subword units, such as phonemes, etc.) and sequences of sounds to identify words that match the sequence of sounds spoken in the utterance represented in the input audio data 211. The ASR component 250 sends (either directly or via the orchestrator component 230) the input text data generated thereby to an NLU component 260 of the speech processing component 260. The input text data output by the ASR component 250 may include a top scoring hypothesis or may include an N-best list including multiple hypotheses. An N-best list may additionally include a score associated with each hypothesis represented therein. Each score may indicate a confidence of ASR processing performed to generate the hypothesis with which it is associated.

Alternatively, a device (such as a mobile device 110b) may send input text data 213 to the server(s) 120. Upon receipt by the server(s) 120, the input text data 213 may be sent to the orchestrator component 230. The orchestrator component 230 may send the input text data 213 to the NLU component 260. Further, input text data may be determined through some other means such as a user's gesture being detected and converted into text data.

The NLU component 260 attempts to make a semantic interpretation of the phrases or statements represented in the input text data input therein. That is, the NLU component 260 (as described in detail herein) determines one or more meanings associated with the phrases or statements represented in the input text data based on individual words represented in the input text data. The NLU component 260 determines an intent (e.g., an action that a user desires be performed) of a command represented in the input text data as well as pertinent pieces of information in the input text data that allow a device (e.g., the device 110, the server(s) 120, the speechlet server(s) 125, etc.) to execute the intent. For example, if the input text data corresponds to "call mom," the NLU component 260 may determine a user intended to activate a telephone in his/her device and to initiate a call with a contact matching the entity "mom."

When audio data of an utterance is received, ASR is performed to determine text corresponding to the audio data and NLU is performed to determine what intent/action is intended by the utterance. Depending on the NLU output data, an instruction is sent to a speechlet component or skill component for handling the action called for in the utterance.

A "speechlet" component may include software running on the server(s) 120 that is akin to an application. That is, a speechlet 290 may enable the server(s) 120 to execute specific functionality in order to provide data or produce some other output requested by a user. The server(s) 120 may be configured with more than one speechlet 290. For example, a weather service speechlet may enable the server(s) 120 to provide weather information, a car service speechlet may enable the server(s) 120 to book a trip with respect to a taxi or ride sharing service, an order pizza speechlet may enable the server(s) 120 to order a pizza with respect to a restaurant's online ordering system, etc. A speechlet component may include hardware, software, firmware, or the like that may be dedicated to the particular speechlet or shared among different components. The speechlet component may be part of the server(s) 120 (for example as speechlet 290) or may be located at whole (or in part) with separate speechlet server(s) 125. Speechlet server(s) 125 may communicate with speechlets 290 within the server(s) 120 and/or directly with the orchestrator 230 or with other components. For present purposes, unless expressly stated otherwise, reference to a speechlet or speechlet component (such as speechlet 290) may include a speechlet component operating within server(s) 120 and/or speechlet operating within speechlet server(s) 125. A speechlet component may take as input NLU output data (such as intent data, slot data, etc.) and may output data that further components of a speech processing system, voice interface system, and/or natural language processing system may use. The output data may take various forms such as text, a URL, an image file, an instruction for a further component to take some further action (such as instructing a home controller to activate an appliance or light switch or the like), or some other output data.

A speechlet 290 may be configured to perform one or more actions. An ability to perform such an action may sometimes be referred to as a "skill." That is, a skill may enable a speechlet component to execute specific functionality in order to provide data or produce some other output requested by a user. A particular speechlet component may be configured to execute more than one skill/action. For example, a weather service skill involve a speechlet component providing weather information to the server(s) 120, a car service skill may involve a speechlet component booking a trip with respect to a taxi or ride sharing service, an order pizza skill may involve a speechlet component ordering a pizza with respect to a restaurant's online ordering system, etc.

A speechlet(s) 290 and may be in communication with one or more speechlet servers 125 implementing different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, as well as custom skills that are not associated with any pre-configured type of skill.

In some instances, a speechlet(s) 290 or a speechlet server(s) 125 may provide output text data responsive to the present user command. The server(s) 120 may include a text-to-speech (TTS) component 280 that generates output audio data from speechlet(s) 290 and speechlet server(s) 125 provided output text data. The TTS component 280 may use different synthesis techniques. In one method of synthesis called unit selection, the TTS component 280 matches text data against a database of recorded speech. The TTS component 280 selects units of recorded speech matching the text data and concatenates the units together to form output audio data. In another method of synthesis called parametric synthesis, the TTS component 280 varies parameters such as frequency, volume, and noise to create output audio data including an artificial speech waveform. Parametric synthesis uses a computerized voice generator, sometimes called a vocoder.

The server(s) 120 may include a user recognition component 295. The user recognition component 295 may take as input the input audio data 211 and/or input text data output by the ASR component 250 as well as potential other input data such as video, biometric data, or the like. The user recognition component 295 determines scores indicating whether the command originated from a particular user. For example, a first score may indicate a likelihood that the command originated from a first user, a second score may indicate a likelihood that the command originated from a second user, etc. The user recognition component 295 also determines an overall confidence regarding the accuracy of user recognition operations. The user recognition component 295 may perform user recognition by comparing audio characteristics in the input audio data 211 to stored audio characteristics of users. The user recognition component 295 may also perform user recognition by comparing biometric data (e.g., fingerprint data, iris data, etc.) received by the system in correlation with the present command to stored biometric data of users. The user recognition component 295 may further perform user recognition by comparing image data (e.g., including a representation of at least a feature of a user) received by the system in correlation with the present command with stored image data (e.g., including representations of features of users). The user recognition component 295 may perform additional user recognition processes, including those known in the art. Output of the user recognition component 295 may be used to inform NLU processing as well as processing performed by speechlets 290 and/or speechlet servers 125, routing by the action manager 275, or other functions.

The server(s) 120 may include a user profile storage 270. The user profile storage 270 may include a variety of information related to individual users, groups of users, etc. that interact with the system. The user profile storage 270 may include one or more customer profiles. Each customer profile may be associated with a different customer ID. A customer profile may be an umbrella profile specific to a group of users. That is, a customer profile encompasses two or more individual user profiles, each associated with a respective user ID. For example, a customer profile may be a household profile that encompasses user profiles associated with multiple users of a single household. A customer profile may include preferences shared by all the user profiles encompassed thereby. Each user profile encompassed under a single customer profile may include preference data specific to the user associated therewith. That is, each user profile may include preference data unique from one or more other user profiles encompassed by the same customer profile. The preference data may include information indicating what preferences the user has with regard to certain speechlets or other information. A user profile may be a stand-alone profile or may be encompassed under a customer profile. A user profile may also include history data which may be data representative of previous interactions between the user of the user profile and the system. As illustrated, the user profile storage 270 is implemented as part of the server(s) 120. However, it should be appreciated that the user profile storage 270 may be located proximate to the server(s) 120, or may otherwise be in communication with the server(s) 120, for example over the network(s) 199. User profile data may be used to inform NLU processing as well as processing performed by speechlets 290.

The server(s) 120 may include an action manager 275 that operates to determine which speechlet(s) should be selected to handle certain particular intents requested by an utterance. The action manager 275 may reference information regarding what actions are executable by what speechlets as well as what data is input/output for the particular speechlets for particular actions. The action manager 275 may reference NLU result data, the action catalog 370, knowledge base 372, or other components and/or data (such as those discussed below) to manage the coordination of action fulfillment by the system.

The action manager 275 may also track a dialog and dialog state across multiple utterances. A dialog is an exchange between the user and the system where the user speaks a command and the system executes it. While many dialogs involve a single utterance, many dialogs may involve many different utterances to ultimately execute the action called for by the user. For example, if the user asks the system to order a pizza, the system may invoke a pizza ordering speechlet and may prompt the user several times for several utterances to obtain the data from the user needed to complete the pizza order (e.g., toppings, time of delivery, any additional items to order, etc.). Another example may be the user invoking a quiz game speechlet, where multiple questions are asked of the user and the user responds with utterances that are processed by the system and whose text data is sent to the quiz show speechlet. Each utterance of the dialog may have a unique utterance ID but may also share a common dialog ID so that the system can process incoming audio data knowing that it is associated with a particular dialog. Previously, a dialog was managed by a particular active speechlet (e.g., the pizza ordering speechlet, the quiz speechlet) which would inform the system (for example the orchestrator 230) when to output a prompt to the user for additional information, when the dialog was finished, etc. While such speechlet dialog management may continue to occur with regard to a single speechlet, in the present system, the action manager 275 may be configured to handle intents that may involve the invocation of multiple speechlets. Thus the action manager 275 may track a dialog state across speechlets, which may be done through the use of various context data/dialog data such as the most recent speechlet invoked, the actions and/or entities invoked in the dialog, the number of turns (e.g., utterance back-and-forth exchanges) of the dialog, the user of each utterance of the dialog, the user profile associated with the dialog, and other information either determined by the system or passed to the action manager 275 from the speechlet component. At each turn of the dialog the action manager 275 may determine the steps to take for the next turn of the dialog (including concluding the dialog). Thus, the action manager 275 may control the dialog. This may allow the system to invoke multiple speechlets per dialog and to obtain data for the dialog from multiple speechlets. Thus the action manager 275 may allow the system to coordinate performing a specific action, even if all the data for that action is not necessarily included with in utterance.

FIG. 3 illustrates how NLU processing may be performed on input text data. Generally, the NLU component 260 attempts to make a semantic interpretation of text represented in text data. That is, the NLU component 260 determines the meaning behind the text represented in text data based on the individual words. The NLU component 260 interprets text to derive an intent or a desired action of the user as well as the pertinent pieces of information in the text that allow a device (e.g., device 110, server(s) 120, speechlet(s) 290, speechlet server(s) 125) to complete that action.

The NLU component 260 may process text data including several hypotheses of a single utterance. For example, if the ASR component 250 outputs ASR results including an N-best list of hypotheses, the NLU component 260 may process the text data with respect to all (or a portion of) the textual interpretations represented therein.

The NLU component 260 may include one or more recognizers 363. Each recognizer 363 may be associated with a different domain or "content source" (e.g., a different speechlet 290 or skill). The NLU component 260 may determine a command represented in text data is potentially associated with more than one action. Multiple recognizers 363 may be functionally linked (e.g., a telephony/communications recognizer and a calendaring recognizer may utilize data from the same contact list). Alternatively, the NLU component 260 may use a single recognizer 363 configured to output potential interpretations of the text data independent of domain.

If the NLU component 260 determines a command represented in text data is potentially associated with multiple actions, the recognizers 363 associated with the domains may each process the text data in parallel. For example, if a command potentially implicates both a communications action and a music action, a recognizer associated with the communications domain may process the text data in parallel, or substantially in parallel, with a recognizer associated with the music domain processing the text data. The output generated by each recognizer may be scored to indicate the respective recognizers confidence in its processing of the text data.

The NLU component 260 may communicate with various storages to determine the potential action(s) associated with a command represented in text data. The NLU component 260 may communicate with an NLU storage 373, which includes databases of devices (374a-374n) identifying actions associated with specific devices. For example, the device 110 may be associated with actions for music, calendaring, contact lists, device-specific communications, etc. In addition, the NLU component 260 may communicate with an entity library 382, which includes database entries about specific services on a specific device, either indexed by device ID, user ID, or group user ID, or some other indicator.

Each recognizer 363 may include a named entity recognition (NER) component 362. The NER component 362 attempts to identify grammars and lexical information that may be used to construe meaning with respect to a command represented in text data input therein. The NER component 362 identifies portions of text represented in text data input into the NLU component 260 that correspond to a named entity that may be recognizable by the system. The NER component 362 (or other component of the NLU component 260) may also determine whether a word refers to an entity that is not explicitly mentioned in the utterance text, for example "him," "her," "it" or other anaphora, exophora or the like.

Each recognizer 363, and more specifically each NER component 362, may be associated with a particular grammar model and/or database 376. Each gazetteer 384 may include domain-indexed lexical information associated with a particular user and/or device. For example, the Gazetteer A (384a) includes domain-indexed lexical information 386aa to 386an. A user's music domain lexical information might include album titles, artist names, and song names, for example, whereas a user's contact-list lexical information might include the names of contacts. Since every user's music collection and contact list is presumably different, this personalized information improves entity resolution.

An NER component 362 applies grammar models 376 and lexical information 386 associated with the domain (associated with the recognizer 363 implementing the NER component 362) to determine a mention one or more entities in text data input thereto. In this manner, the NER component 362 identifies "slots" (i.e., particular words in text data) that may be needed for later command processing. The NER component 362 may also label each slot with a type of varying levels of specificity (e.g., noun, place, city, artist name, song name, etc.).

Each grammar model 376 includes the names of entities (i.e., nouns) commonly found in text about the particular domain to which the grammar model 376 relates, whereas the lexical information 386 is personalized to the user(s) and/or the device 110 from which the input audio data 211 or input text data 213 originated. For example, a grammar model 376 associated with a shopping domain may include a database of words commonly used when people discuss shopping.

A downstream process called named entity resolution actually links a portion of text to an actual specific entity known to the system. To perform named entity resolution, the NLU component 260 may utilize gazetteer information (384a-384n) stored in an entity library storage 382. The gazetteer information 384 may be used to match text represented in text data with different entities, such as song titles, contact names, etc. Gazetteers may be linked to users (e.g., a particular gazetteer may be associated with a specific user's music collection), may be linked to certain domain categories (e.g., shopping, music, video, communications, etc.), or may be organized in a variety of other ways. NER and/or entity resolution may also rely on a universal entity catalog 383 that may include a universal catalog of entities understandable across speechlets.

Each recognizer 363 may also include an intent classification (IC) component 364. The IC component 364 parses text data to determine an intent associated with the recognizer 363 that potentially corresponds to the text data. An intent corresponds to an action to be performed that is responsive to the command represented by the text data. The IC component 364 may communicate with a database of words linked to intents/actions. For example, a music intent database may link words and phrases such as "quiet," "volume off," and "mute" to a "mute" intent. The IC component 364 identifies potential actions by comparing words in the text data to the words and phrases in an intents/actions catalog 370. As discussed below, the action catalog 370 may include information about actions that are executable by the speechlets 290. The recognizer(s) 363 may process the text data and attempt to match it with one or more actions of the action catalog 370.

The intents identifiable by a specific IC component 364 may be linked to domain-specific (i.e., the domain associated with the recognizer 363 implementing the IC component 364) grammar frameworks 376 with "slots" to be filled. Each slot of a grammar framework 376 corresponds to a portion of the text data that the system believes corresponds to an entity. For example, a grammar framework 376 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (implemented by the same recognizer 363 as the NER component 362) may use the identified verb to identify an intent. The NER component 362 may then determine a grammar model 376 associated with the identified intent. For example, a grammar model 376 for an intent corresponding to <GetReservation> may specify a list of slots applicable to make a reservation using the identified "object" and any object modifier (e.g., a prepositional phrase), such as {Restaurant Name}, {Movie Name}, {Flight Number}, etc. The NER component 362 may then search corresponding fields in a lexicon 386 associated with the domain associated with the recognizer 363 implementing the NER component 362, attempting to match words and phrases in the text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music domain recognizer 363 may parse and tag text corresponding to "get me a reservation at the supper club" as {Verb}: "Get," {Object}: "reservation," {Object Preposition}: "at," and {Object Modifier}: "the supper club." The NER component 362 identifies "Get" as a verb based on a word database associated with the reservation domain, which an IC component 364 (also implemented by the reservation domain recognizer 363) may determine corresponds to a <GetReservation> intent. At this stage, no determination has been made as to the meaning of "the supper club," but based on grammar rules and models, the NER component 362 has determined that the text of these phrases relates to the grammatical object (i.e., entity) of the text data.

The frameworks linked to the intent are then used to determine what database fields should be searched to determine the meaning of these phrases, such as searching a user's gazetteer 384 for similarity with the framework slots. For example, a framework for a <GetReservation> intent might indicate to attempt to resolve the identified object based {Restaurant Name}, {Movie Name}, and {Flight Number}, and another framework for the same intent might indicate to attempt to resolve the object modifier based on {Restaurant Name}, and resolve the object based on {Movie Name} and {Flight Number}. If the search of the gazetteer 384 does not resolve a slot/field using gazetteer information, the NER component 362 may search the database of generic words associated with the domain (in the knowledge base 372). For example, if the text data including text corresponding to "get me a reservation at the supper club," after failing to determine a restaurant with the name called "supper club," the NER component 362 may search the domain's vocabulary for the word "supper." In the alternative, generic words may be checked before the gazetteer information, or both may be tried, potentially producing two different results.

The NLU component 260 may tag text to attribute meaning to the text. For example, the NLU component 260 may tag "get me a reservation at the supper club in New York" as: {intent} <GetReservation>, {restaurant name} supper club, and {location} NYC. For further example, the NLU component 260 may tag "get me a dinner reservation for New Year's" as: {intent} <GetReservation>, {datetime} Dec. 31 at 8 p.m.

Figure 4:
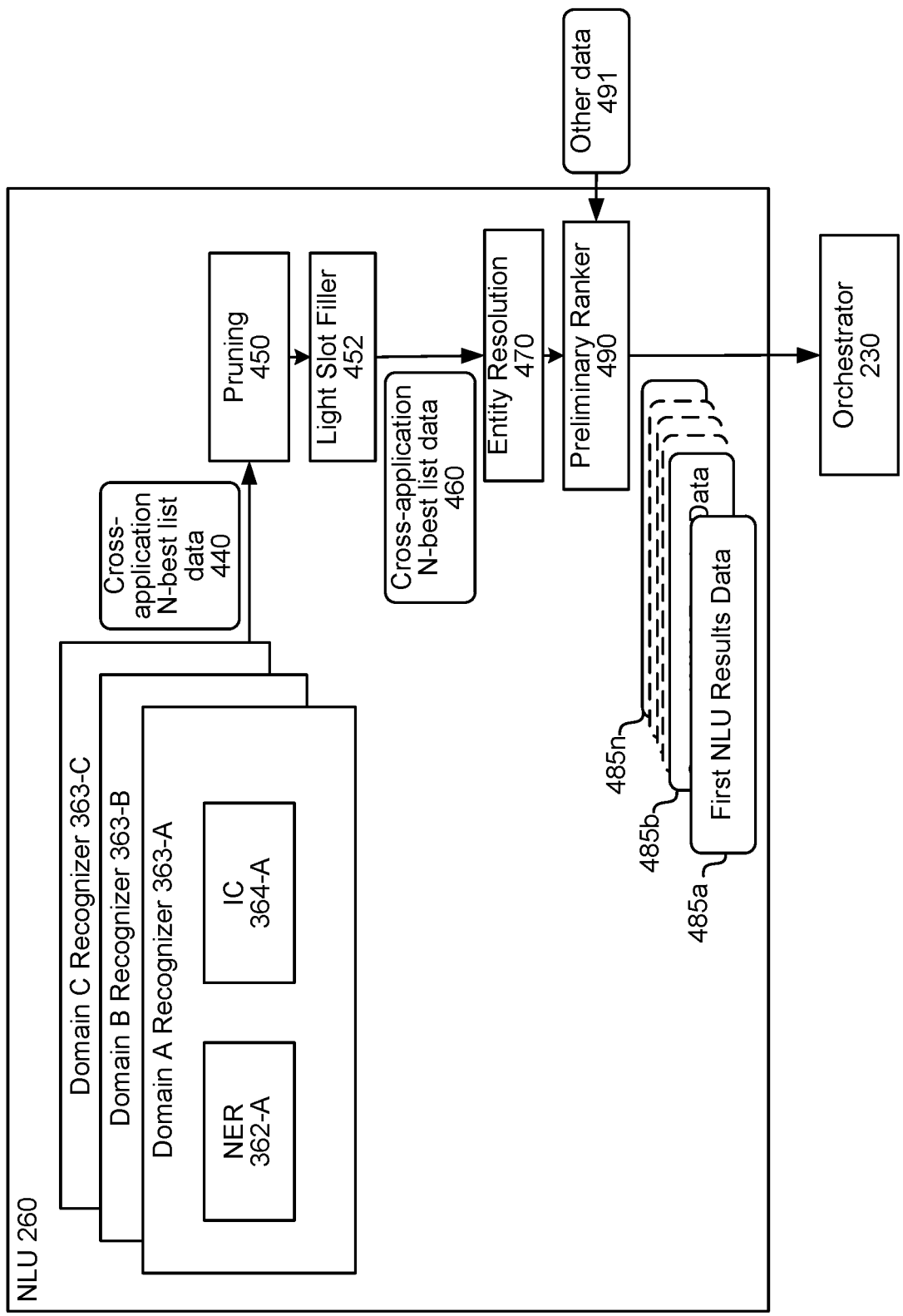
FIG. 4 is a conceptual diagram of how natural language processing is performed according to embodiments of the present disclosure.

The NLU component 260 may compile data, output by the recognizer(s) 363 that processed the text data input to the NLU component 260, into a single N-best list, and may send N-best list data 440 (representing the N-best list) to a pruning component 450 (as illustrated in FIG. 4). Each entry in the N-best list data 440 may correspond to tagged text output by a different recognizer 363. Each entry in the N-best list data 440 may be associated with a respective score indicating the tagged text corresponds to the domain associated with the recognizer 363 from which the tagged text was output. For example, the N-best list data 440 may be represented as:

[0.95] Action: <GetReservation> RestaurantName: supper club DateTime: Dec. 31 at 8 p.m.

[0.50] Action: <GetReservation> RestaurantName: supper club DateTime: Jan. 1 at 8 p.m.

[0.01] Action: <GetReservation> MovieName: supper club DateTime: Dec. 31 at 8 p.m.

[0.01] Action: <GetReservation> MovieName: supper club DateTime: Jan. 1 at 8 p.m.

The pruning component 450 creates a new, shorter N-best list (i.e., represented in N-best list data 460 discussed below) based on the N-best list data 440. The pruning component 450 may sort the tagged text represented in the N-best list data 440 according to their respective scores.

The pruning component 450 may perform score thresholding with respect to the N-best list data 440. For example, the pruning component 450 may select entries represented in the N-best list data 440 associated with a score satisfying (e.g., meeting and/or exceeding) a score threshold. The pruning component 450 may also or alternatively perform number of entry thresholding. For example, the pruning component 450 may select the top scoring entry(ies) associated with each different category of domain (e.g., music, shopping, communications, etc.) represented in the N-best list data 440, with the new N-best list data 460 including a total number of entries meeting or falling below a threshold number of entries. The purpose of the pruning component 450 is to create a new list of top scoring entries so that downstream, more resource intensive processes may only operate on the tagged text entries that most likely correspond to the command input to the system.

The NLU component 260 may also include a light slot filler component 452. The light slot filler component 452 can take text from slots represented in the tagged text entry(ies) output by the pruning component 450 and alter it to make the text more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a tagged text entry includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the N-best list data 460.

The NLU component 260 sends the N-best list data 460 to an entity resolution component 470. The entity resolution component 470 can apply rules or other instructions to standardize labels or tokens from previous stages into an intent/slot representation. The precise transformation may depend on the domain (e.g., for a travel domain, the entity resolution component 470 may transform a text mention of "Boston airport" to the standard BOS three-letter code referring to the airport). The entity resolution component 470 can refer to an authority source (e.g., a knowledge base) that is used to specifically identify the precise entity referred to in each slot of each tagged text entry represented in the N-best list data 460. Specific intent/slot combinations may also be tied to a particular source, which may then be used to resolve the text. In the example "play songs by the stones," the entity resolution component 470 may reference a personal music catalog, Amazon Music account, user profile (described herein), or the like. The entity resolution component 470 may output data including an altered N-best list that is based on the N-best list represented in the N-best list data 460, but also includes more detailed information (e.g., entity IDs) about the specific entities mentioned in the slots and/or more detailed slot data that can eventually be used by a speechlet. The NLU component 260 may include multiple entity resolution components 470 and each entity resolution component 470 may be specific to one or more speechlet.

The entity resolution component 470 may not be successful in resolving every entity and filling every slot represented in the N-best list data 460. This may result in the entity resolution component 470 outputting incomplete results. The NLU component 260 may include a final ranker component 490, which may consider such errors when determining how to rank the tagged text entries for potential execution. For example, if a book domain recognizer 363 outputs a tagged text entry including a <ReadBook> intent flag, but the entity resolution component 470 cannot find a book with a title matching the text of the item, the final ranker component 490 may re-score that particular tagged text entry to be given a lower score. The final ranker component 490 may also assign a particular confidence to each tagged text entry input therein. The confidence score of a particular tagged text entry may be affected by whether the tagged text entry has unfilled slots. For example, if a tagged text entry associated with a first domain includes slots that are all filled/resolved, that tagged text entry may be associated with a higher confidence than another tagged text entry including at least some slots that are unfilled/unresolved.

The final ranker component 490 may apply re-scoring, biasing, or other techniques to obtain the most preferred tagged and resolved text entry. To do so, the final ranker component 490 may consider not only the data output by the entity resolution component 470, but may also consider other data 491. The other data 491 may include a variety of information. For example, the other data 491 may include domain rating or popularity data. For example, if one domain has a particularly high rating, the final ranker component 490 may increase the score of a tagged text entry(ies) associated with or otherwise invoking that particular domain. The other data 491 may also include information about domains that have been specifically enabled by the user. For example, the final ranker component 490 may assign higher scores to tagged text entries associated with or otherwise invoking enabled domain s than tagged text entries associated with or otherwise invoking non-enabled domain s. User history may also be considered, such as if the user regularly uses a particular domain or does so at particular times of day. Date, time, location, weather, type of device 110, user ID, context, and other information may also be considered. For example, the final ranker component 490 may consider when any particular domains are currently active (e.g., music being played, a game being played, etc.). Following final ranking, the NLU component 260 may output NLU output data 485 to the orchestrator component 230. The NLU output data 485 may include intent data, slot data, or other data. For example, the NLU output data 485 may include various entries, with each entry representing an NLU processing confidence score, an intent, intent score, slot data, and a potential skill or speechlet that may operating with respect to the respective entry's data.

The NLU output data 485 (which may include an N-best list of potential interpretations of the input text, each with a selected action and/or score) may then be sent to the action manager 275 to determine the speechlet most appropriate for executing the action of the entry in the N-best list. The action manager 275 may make use of the action catalog 370 which includes data regarding the actions performable by which speechlets of the system.

Figure 5:
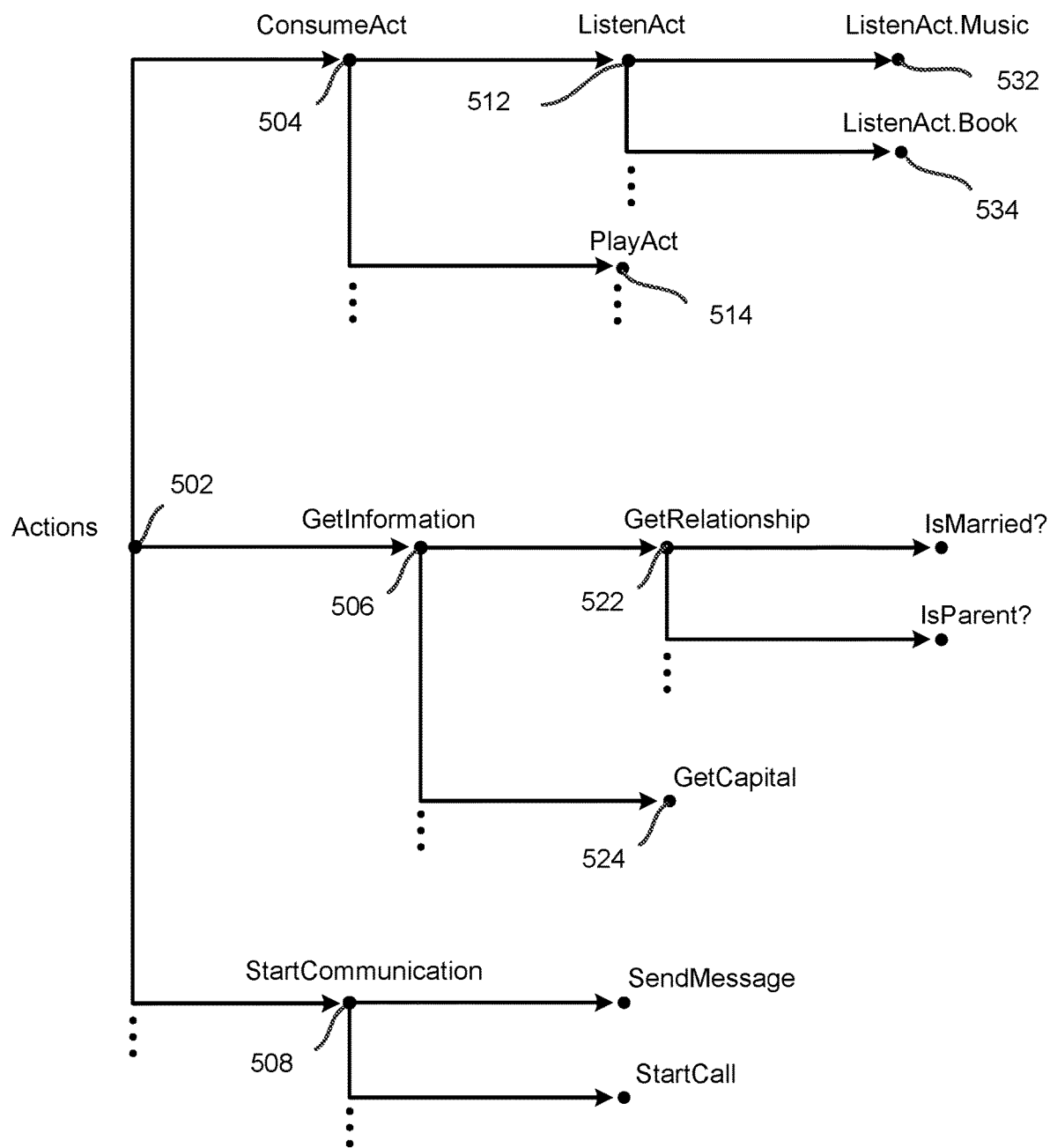
FIG. 5 illustrates a representation of actions that can be used across speechlets according to embodiments of the present disclosure.

The actions represented in the action catalog 370 may be represented in a hierarchical representation of actions that may be used to perform the NLU operations discussed herein in a domain-agnostic manner. FIG. 5 illustrates an example of one arrangement of actions within an action catalog 370. As illustrated in FIG. 5, the actions may be structured in a hierarchical manner, such that certain actions may be linked to other actions in a tree-like structure, though such a structure is optional. As shown, all actions may be linked to a root node 502 for actions. Actions are then organized according to categories, such as ConsumeAct 504, GetInformation 506, StartCommunication 508, etc. Sub-categories may also exist (such as ListenAct 512, PlayAct 514, etc. being sub-categories of ConsumeAct 504) with individual actions located at some point in the action catalog 370 below the root node. Each action may be represented not only with some action ID indicating the specific action (such as ListenAct.Music) but also with a hierarchical indication of how the action relates to the root node. For example, action ListenAct.Music may be represented by/ConsumeAct/ListenAct/ListenAct.Music or the like. The action catalog 370 may be stored in NLU storage 273, or in other storage accessible by the system. As can be appreciated, FIG. 5 is only an example of a hierarchical representation of actions, and other configurations/organizations can be used. The actions of action catalog 370 may be universally used by multiple speechlets and various components of the system. The action catalog 370 may also track the input data and output data types needed to execute a particular action.

A universe of entities, where the different entities and entity types may be used across domains and speechlets, may also be used and stored as entity catalog 383. Thus, a particular entity type may be represented by a node on an entity hierarchy, which may include a hierarchical indication of how the entity type relates to the root node. The entity type representation may also have finer levels of representation to represent different categories, for example/person/artist/musician/composer may be used to represent a composer. Further, the entity type hierarchy may also include types that are associated with parts of text used to interpret commands but may not necessarily correspond to specific entities, such as enumerations, intangibles, and other items that do not specifically correspond to an entity.

The hierarchy of entities may be stored in the knowledge base 372, in entity library 382, or in some other manner. Data regarding the specific entities themselves may be also be stored. Each entity may be associated with an entity ID as well as with one or more nodes in the entity type hierarchy. The entity ID may be a unique ID for a particular entity, such as an ASIN (Amazon Standard Identification Number) or other identifier. As can be appreciated, other configurations/organizations of entities may also be used. The entities tracked by the entity catalog 383 may include not only specific named entities such as individuals, places, etc. but also other data that may be considered an entity such as data regarding a restaurant reservation, car reservation, or the like. The entity catalog 383 may track the type of data of a particular entity so that the type information may be used when operating speechlets. The entity catalog may also include data regarding which actions are capable of operating on what entities/data types.

The actions of the action catalog 370 and entities of entity catalog 383 may be used as a common reference ontology for all speechlets to describe the functions they perform and the entities they consume and create.

Figure 6A:
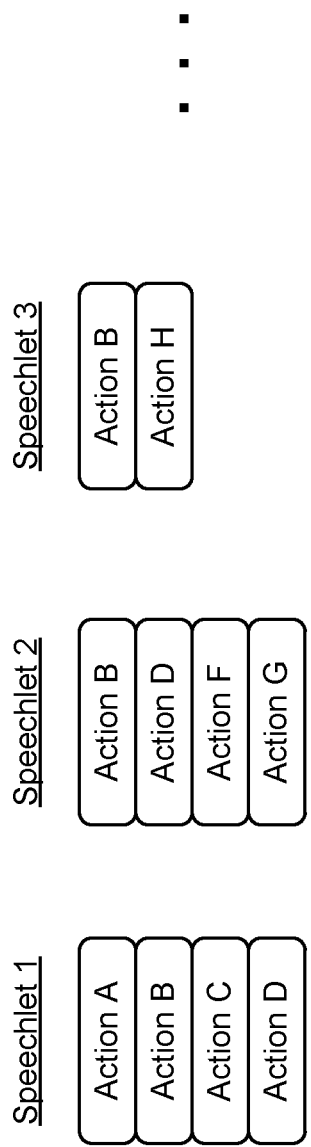
FIGS. 6A-6B illustrates how different speechlets may take operate on different input data and may output different output data for particular actions according to embodiments of the present disclosure.

The action manager 275 or other component may include other information about the various actions executable by the speechlets of the system. For example, as shown in FIG. 6A the action manager 275 may include a listing of the available speechlets of the system as well as what actions each speechlet may perform. The action manager 275, or other components of the system (such as the profile storage 270) may keep track of what speechlets/actions have been enabled for what users.

Figure 6B:
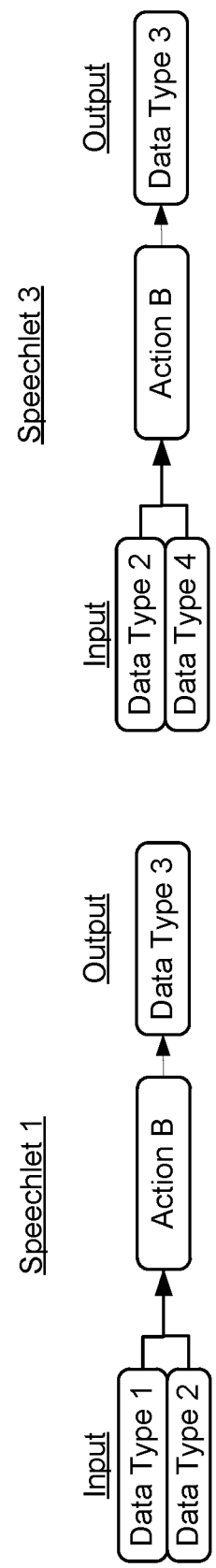

As shown in FIG. 6B, the action manager 275, or other component may also include data regarding what data is needed by a particular speechlet to execute a particular action. For example, to execute action B, speechlet 1 may need input data of data type 1 and data type 2, and after executing the action may output data of data type 3. A different speechlet, however, may use different data types to execute the same action. For example, to execute action B, speechlet 3 may need input data of data type 2 and data type 4, and after executing the action may output data of data type 3.

Figure 7:
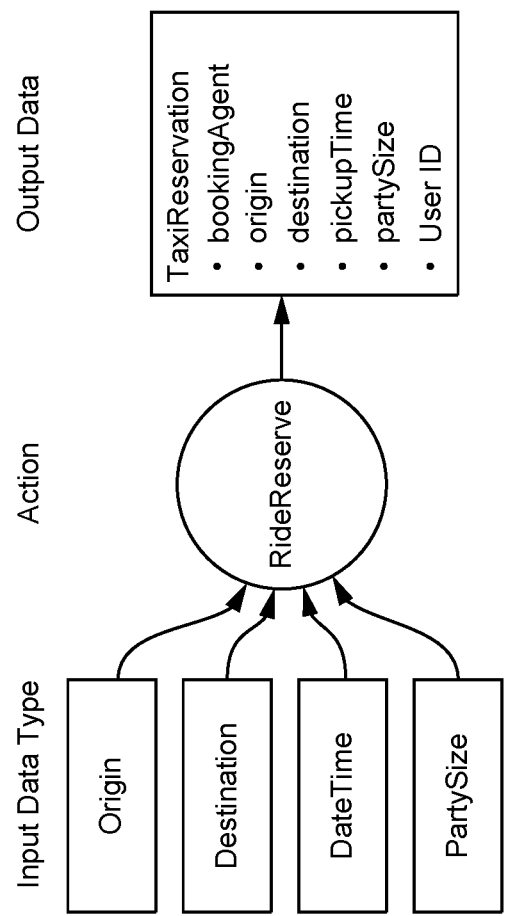
FIG. 7 illustrates an example of the input data and output data for a ride reserve action according to embodiments of the present disclosure.

As an example, FIG. 7 illustrates an example of the input data and output data for a ride reserve action. As illustrated, the ridereserve action may take as input data, an origin, a destination, datetime, and partysize. Each of those data types may be a data entity represented in the entity catalog 383. The output data of the ridereserve action may be a taxireservation entity that includes various data including the bookingagent (which may correspond to the speechlet called to execute the action) as well as the origin, destination, pickuptime and partysize that were used to execute the ridereserve (which may have been expressly provided by a user or may have been obtained by the action manager from user history data, preference data, calendar data or using an interim speechlet as described below) along with user ID and potentially other information to execute the reservation.

In previous speech processing systems a particular speechlet would need to define the slot data types needed to execute a particular action, and that slot information would be used in training a recognizer component (e.g., recognizer 363, NER 362, etc.) so that the appropriate slot data would be identified by a recognizer associated with the speechlet's domain. With the current system, however, a speechlet may simply identify the data type needed to execute a particular action (see, for example FIG. 6B), and the system may process incoming text data (as well as other data sources as explained below) with regard to the data types as defined in the ontology of the entity catalog 383.

Thus, the action manager 275 can use the action catalog 370 to determine when certain speechlets are capable of performing the same action. Further, as the entity catalog 383 may also include type data for the entities used by the system, the action manager 275 may also track what entities are capable of being operated on by what speechlets. Further, as a speechlet performs operations, the action manager 275 or other component of the system may track the output of the speechlet in a form that may be useful to other components (such as other speechlets) of the system. That is because the action catalog 370 and entity catalog 383 allow data to be more easily compared/exchanged between speechlets whereas more domain-specific systems may result in each domain having its own actions and/or entities that may not align with those used by other domains.

Previous systems may have resulted in speechlets outputting data as unstructured text or simply having a speechlet perform an action with no record that can be used across speechlets as to how a particular utterance was processed. This made it difficult to carry across context information that was useful in a way across speechlets. Further, previously an individual speechlet may have been required to implement all the functionality needed for the speechlet within the speechlet itself, without the ability to rely on data from other speechlets to assist another speechlet in executing its actions.

The action manager 275 may be configured to handle intents that may require invocation of multiple speechlets in order to execute. For example, certain intents such as reservation intents, vacation planning and travel intents, review and purchase intents, or the like may involve the coordination between multiple different speechlets. As a specific example, an utterance such as "make me a dinner reservation at the best pizza place in town" may involve invocation of both a restaurant review speechlet in order to identify the "best pizza place in town" as well as a restaurant reservation speechlet. As another example, an utterance such as "order the best headset under $100 for my Sunday game tournament" may involve invocation of a gaming speechlet to identify the game(s) relevant to the "Sunday game tournament," a product review speechlet to identify the "best headset under $100" that may mention the identified game(s), and a shopping speechlet to actually order the headset. Various other data points may also be accessed by the action manager 275 to handle such intents such as user preference information (which may inform the choice of restaurant, headset or shopping site), calendar information (which may inform the information about how many in the dinner party or what games are played on Sundays), etc.

The action manager 275 may thus be configured to handle a particular subset of intents of the system. The NLU component 260 may maintain a list of the intents that can be handled by the action manager 275. When such an intent is determined with regard to an utterance, the system may invoke the action manager 275 and pass it the data needed to execute the intent such as NLU results data, slot data, user data, historical data, or other data used by the action manager 275 as described herein. The action manager 275 may structure a dialog or exchange with speechlets using the appropriate instructions, syntax, or the like to interact with the speechlets via APIs or the like and may track the progress of interactions between the user and the system to obtain the data needed to execute a requested intent.

Further, the system may track historical data for a user's interactions with a system in a manner that allows comparison across speechlets. For example, if a system receives an utterance for a user and executes an action for the utterance using a particular speechlet, the system may store the information regarding the utterance, the specified action, the entities used to execute the action, and other data. For example, the system may record data regarding the utterance such as [date|time|deviceID|userID|actionID|inputentity1ID|inputentity2ID|outputentity1ID]. Other information such as video data, audio data, user feedback/user sentiment data (e.g., whether the user appeared happy or displeased during the utterance exchange), or the like may also be stored as history data. As can be appreciated, different data and different forms of storing the history data may be used.

Using the history data the system may track user interactions across speechlets for various purposes. For example, if the user first encounters a product using a first recommendation speechlet, and then eventually purchases the product, the system may determine that the first recommendation speechlet was the user's first encounter with the product and may allocate some revenue to the first speechlet.

Figure 8:
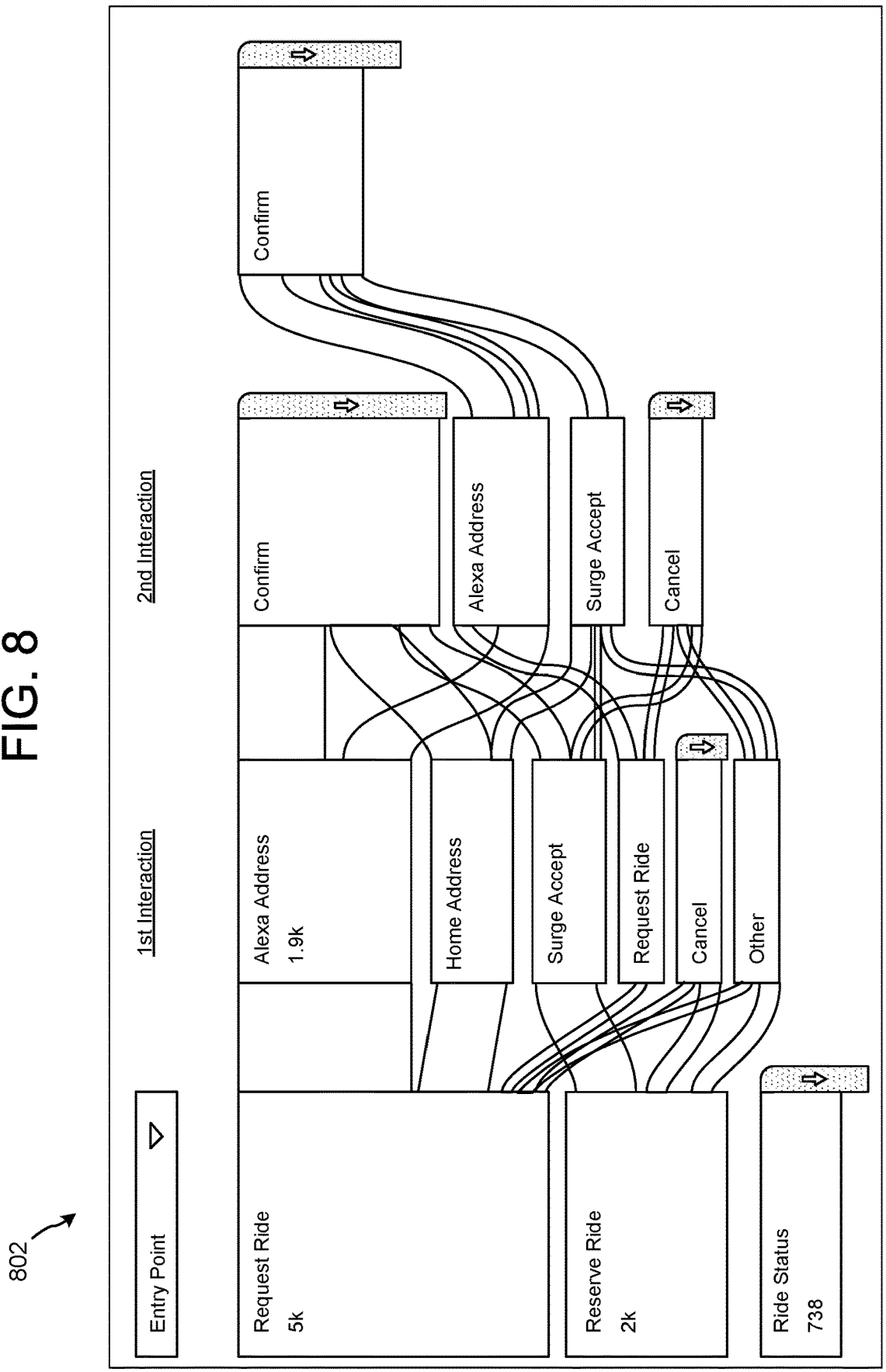
FIG. 8 is a conceptual diagram of how users may interact with various actions of a ride service speechlet according to embodiments of the present disclosure.

Further, using the history data, the system may track interactions of multiple users across many different dialogs to determine how users typically progress through actions under various circumstances. As an example, FIG. 8 is a conceptual diagram of how users may interact with various actions according to embodiments of the present disclosure. As shown in FIG. 8, 802 is a graph illustrating example user activity density across the performance of different actions related to a ride request speechlet. Each column represents different points of interaction with the speechlet, with the different activities represented by each box and the size of each box reflective of the relative number of users who take the particular activity in the example set. Thus, as illustrated, in an example collection of history data across users, in the entry point with a ride speechlet, ~5,000 users start with requesting a ride (e.g., an immediate ride), 2,000 users start with reserving a ride (e.g., a ride for a future time and less than a thousand start with a ride status request. On the next interaction, of the users that request a ride, just under 2,000 provide the address of their device (e.g., "Alexa address"). Then, from each of those choices some users then confirm the ride, while others accept a surge pricing and so forth for each of the actions with the ride speechlet.

Such history data may be used to provide feedback to the speechlet as to how users interact with the speechlet. The history data may also be used to train a model, such as a model for use with the action manager 275, in determining how to route and process incoming utterances. For example, if a number of users take certain paths (e.g., using certain types of data and actions to arrive at an ultimate desired action) to execute certain actions, the system may learn this information and execute certain actions and/or prompt for certain data types to follow a popular path to achieve a certain action.

The system may also track history data specific to a particular user/user profile, which enables the system to learn and take certain actions with respect to utterances based on the user that speaks the utterance.

Figure 9:
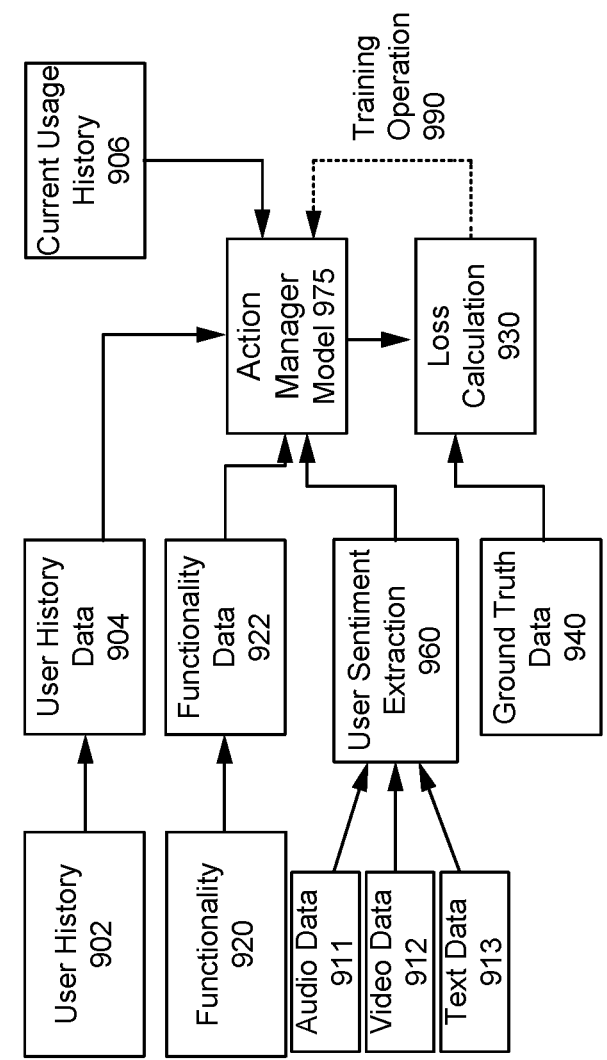
FIG. 9 is a conceptual diagram of how a model may be trained for purposes of managing selection and operation of speechlets according to embodiments of the present disclosure.

An example for an architecture for training a model that can be used to process an utterance based on user data is shown in FIG. 9. As shown, a variety of data points are taken for each utterance and are aligned with ground truth data 940 to be used to train an action manager model 975 using loss calculation function 930 and a model training operation 990. For each training utterance (which may be taken from history data or other utterances of a training set), the model training may incorporate the user history 902 (which may include customer preference data), which is represented by user history data 904 (which may include a feature vector representation of the user history 902 that can be processed by the model 975). To create the user history data 904 the system may process the user history 902 to extract features from the user history that can be used by the system to make predictions on potential future actions of a user depending on operating conditions. For example, the system may determine user routines with the user history data 904 and may encode information about those routines into the user history data 904 that may be used to train the action manager model 975. The model may also consider the available functionality 920 of the actions that can be performed with respect to the user (such as enabled actions, speechlets or the like) which may be represented by functionality data 922 (which may which may include a feature vector representation of the functionality 920 that can be processed by the model 975). The model training may also consider audio data 911, video data 912 and/or text data 913 corresponding to the user who spoke an utterance which may be processed by a user sentiment extraction component 960 which uses the audio data 911, video data 912 and/or text data 913 to determine whether the user was pleased, displeased, frustrated, or otherwise had particular sentiments regarding the processing of the particular training utterance. The training may also incorporate the current usage history 906, which may include data regarding the current ongoing session of the user's interaction with the system. For example, if a session of an interaction between the user and the system includes the training example operation, it may also include other operations between the user and the system such as an ongoing spoken dialog, interactions by a user with a screen of a device, interactions with a user on another related device (such as a screen on a different device from a screen capture device), or the like. The training may also include the ground truth data 940 which may include the text data of an utterance as well as the correct action to take in response to the particular utterance, so that the training operation 990 and loss calculation function 930 can properly train the model 975.

The model 975 may be trained individually for each user (such that a custom model is created for a particular user) or the model 975 may be trained for multiple users, such that the model learns how to process an incoming utterance using history data, text data, etc. for multiple different users. This enables the same model to be deployed to handle utterances for many different users. The model 975 may thus be trained to consider a variety of input data and factors when determining how to handle an incoming utterance to achieve a user's goal. For example, when a user asks for a ride, the action manager 275 (operating the trained model 975) could query all of the available ride providers, compare quotes for fulfilling the ride, then pick the best provider. Given the aforementioned data sources, the arbitration model can learn to estimate the N-best paths (e.g., ways to obtain data from different speechlets to execute the action of the utterance) that best accomplish a particular user's goal.

The model 975 may be trained in intervals (e.g., daily) or may be configured such that runtime operations can be used to update weights of the model to allow some retraining of the model in between runtime utterances. To assist in training the system may capture additional history data/sentiment data and use that data for re-training the model 975 (either offline or during runtime).

Figure 10:
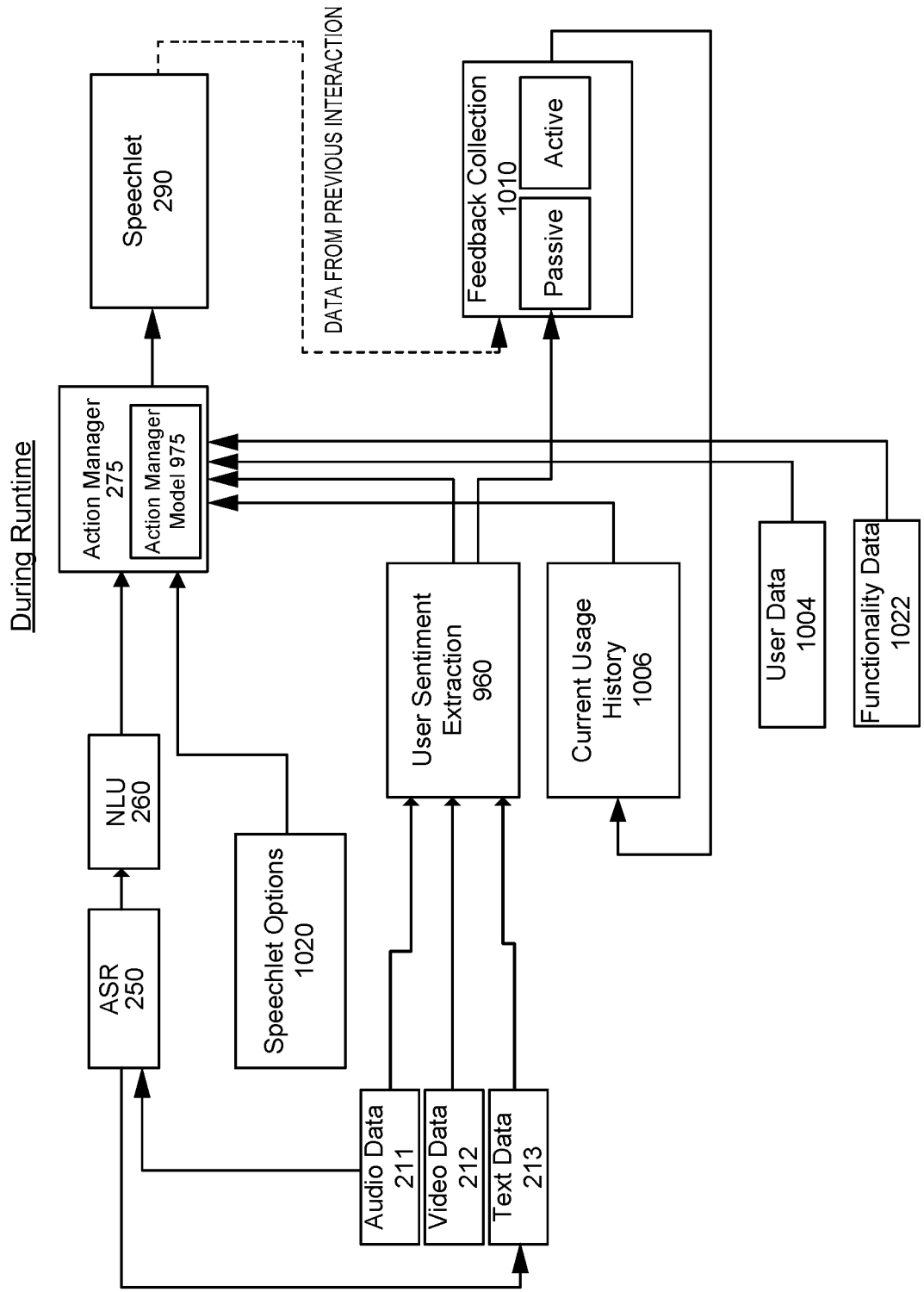
FIG. 10 is a conceptual diagram of how a component of a speech processing system may use a trained model to consider various data when determining how to process an incoming speech command according to embodiments of the present disclosure.

FIG. 10 illustrates how the system may use the trained model 975 at runtime to consider various data when determining how to process an incoming utterance. As shown, the model 975 may be run by the action manager 275. The incoming runtime audio data 211 is processed by the ASR component 250 to determine text data, which is then processed by the NLU component 260 to determine NLU result data. The NLU result data may include an indication of an action requested by the utterance. The NLU result data is sent to the action manager 275. The action manager 275 also receives data represent the functionality data 922 that are available to the action manager 275 at runtime. The functionality data 922 may include data representing which speechlets are currently available to the system well as what actions are performable by those speechlets and what input data/output data correspond to each action/speechlet. That data may include data from the action catalog 370, entity catalog 383, or other sources. The functionality data 1022 and/or other data (such as the user data 1004) may indicate what actions are available for the particular user of the utterance. The speechlet options 1020 may include candidate speechlets that the action manager 275 can route requests to. The action manager 275 may also consider the user data 1004 which may include user preference data, user history data, or the like.

At runtime the action manager 275 may also consider user sentiment data being output by the user sentiment extraction component 960 which processes the runtime audio data 211 (which includes the utterance), video data 212 (which may be taken by an image capture device during the utterance), text data 213 (which may be the text output by the ASR component 250) or other data and outputs user sentiment data which represents the user's satisfaction with the system operation at the time of the utterance. For example, if the user appears to be extremely dissatisfied, depending on how the model 975 is trained, the action manager 275 may determine to end the dialog to avoid further user dissatisfaction. On the other hand, if the user appears satisfied, the action manager 275 may continue processing the dialog in the current manner.

The action manager 275 may also consider the current usage history 1006 which may include a representation of the dialog so far including how many turns/utterances have happened so far for the dialog, what speechlets have been activated, what actions have been requested, what entities were provided in the utterances, what entities output by speechlets, how far the system is from obtaining the data needed to execute the desired action, as well as how the user has been reacting to the dialog thus far, which may be processed by the feedback collection component 1010 which track passive feedback (such as the user sentiment data from the user sentiment extraction component 960) as well as active feedback (such as a user expressly giving certain responses/reactions to the system as part of the dialog). Thus the action manager 275 may consider feedback data (which may include passive feedback data such as user sentiment data or express feedback data provided by the user).

Thus the action manager 275, using the action manager model 975, may take NLU result data for an utterance and select one or more speechlets to perform the action indicated in the NLU result data in a particular way for a particular user by considering all the information of FIG. 10 (which is represented in one or more feature vectors processable by the model 975) to obtain the best way to achieve the action for the particular user. The model 975 may output one or more scores corresponding to one or more directives to take in response to the particular utterance/dialog turn under consideration. The model may thus output a first confidence score that a first action of a first speechlet should be invoked, a second confidence score that a second action (or the first action) of a second speechlet should be invoked, and so forth. Thus, even the identical NLU results may result in different actions being taken for different users due to different user dialog history 1006, different user data 1004, etc.

In particular, the action manager 275 may determine that there is information in the data available to it that can be used to supplement the NLU results, either in indicating other actions that should be performed, other data that should be obtained, or the like. For example, if a particular user is regularly using a particular ride request service speechlet to go to restaurants that are reserved using a restaurant reservation speechlet, the system may determine, using the representation of the history data for that user, that when that user sends a ride request, a query may be made to the restaurant reservation speechlet to detect if there is an upcoming reservation and prompt the user as to whether the user intends to go to the address of the upcoming reservation. Alternately, the action manager 275 may simply send that address to the ride request service speechlet without first prompting the user. Similarly, if the user is making a dining reservation request in an utterance, but a restaurant reservation speechlet needs a party size in order to complete the reservation. The action manager 275 may determine, using calendar data (represented in user data 1004) that the user has an appointment with four people coming up so the action manager 275 may send the restaurant reservation speechlet a party size of four even without first prompting the user for the party size. The action manager 275 may also determine when to prompt a user for specific information needed to execute an action (e.g., send text data requesting specific information to the TTS component 280 for synthesizing an audio output prompt to be sent to a device 110). As can be appreciated, many such operations by the action manager to select actions and/or data to be sent to speechlets are possible, even if such actions/data are not expressly included in the utterance.

The action manager 275 may also select the particular speechlet to handle a particular action. If the utterance specifically names a speechlet, such a routing decision may be easy (e.g., an utterance of "Alexa, ask Excellent Ride Service to book me a ride" may be routed to a speechlet component associated with Excellent Ride Service). On the other hand, if the utterance does not specifically name a speechlet (e.g., "Alexa, book me a ride") the system may rely on a variety of different data points to determine which speechlet component to activate to handle a specific action.

Further, the action manager 275 may be able to activate more than one speechlet to complete a particular action. For example, if the speechlet that can perform the action specifically intended by the utterance needs more data than the system has available, the system may call an intermediate speechlet that can output that particular piece of data. Thus, as the action manager 275 may have information regarding what speechlets can output what data (using what input data), it may track a path of utterances/speechlets to determine a final response to the intent of the utterance.

Figure 11:
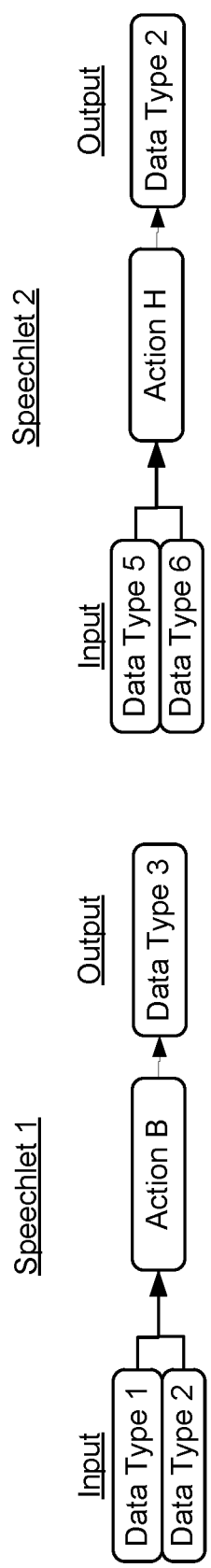
FIG. 11 illustrates how an action manager may identify a second speechlet to execute a second action to output data to be input to a first speechlet to perform a first according to embodiments of the present disclosure.

As shown in FIG. 11, using the information about what speechlets can execute what actions to output what data (and using what input data) the action manager 275 may identify a first speechlet that can perform a first action that may have been invoked by an utterance (e.g., speechlet 1 can perform action B) as well as the input data needed by the first speechlet to perform the first action (e.g., data of data type 1 and data of data type 2). If one of the input data types is not included in the utterance (for example, the post-ASR text of the utterance does not include text that corresponds to data type 2) the action manager 275 may identify another speechlet that performs a second action (e.g., speechlet 2 can perform action H) that can output the data type needed, here data type 2. The action manager 275 may then identify data needed to perform the second action (e.g., input data of data type 5 and data type 6) and then send that data to the speechlet 2 so that it may perform action H, output data of type 2, which the action manager may then send to speechlet 1 to perform the first action.

Thus, the NLU component 260 may output a particular action to be executed and the action manager 275 may select, using the information available to it, what speechlet component to activate to perform the action. Further, as part of the NLU output, the NLU component 260 may also output slot data, such as text corresponding to a recognized named entity, or even an entity ID as determined by a named entity recognizer. The action manager 275 may receive that data and determine what data (and of what data type the data is) is available that corresponds to the utterance. The action manager 275 may then select a speechlet component that can execute the first action and operate on the slot data that was sent as part of the NLU results. Further, the action manager 275, knowing what data types are needed to execute the action by the speechlet component, may determine what data types are missing (meaning not included with the utterance) in order to execute the first action. For example, if a speechlet component needs two types of data to perform an action, but only one data type is included with the utterance, the action manager 275 may determine that the speechlet component needs the data of the second data type to perform the action. The action manager 275 may then take certain steps to acquire the data of the second data type to ultimately send to the speechlet component for execution of the action.

During some training period, or as part of system configuration, the system may build a mapping of the input data and output data of actions so that the system, for example using the action manager 275 can determine what actions (and speechlets) may be used to obtain data types that may be used by other actions (and speechlets). Thus the action manager 275 may determine at runtime to obtain missing data for one speechlet by activating another. This allows the system to call on certain speechlets even if the certain speechlet (or its action) is not necessarily specifically invoked by the utterance.

Figure 12:
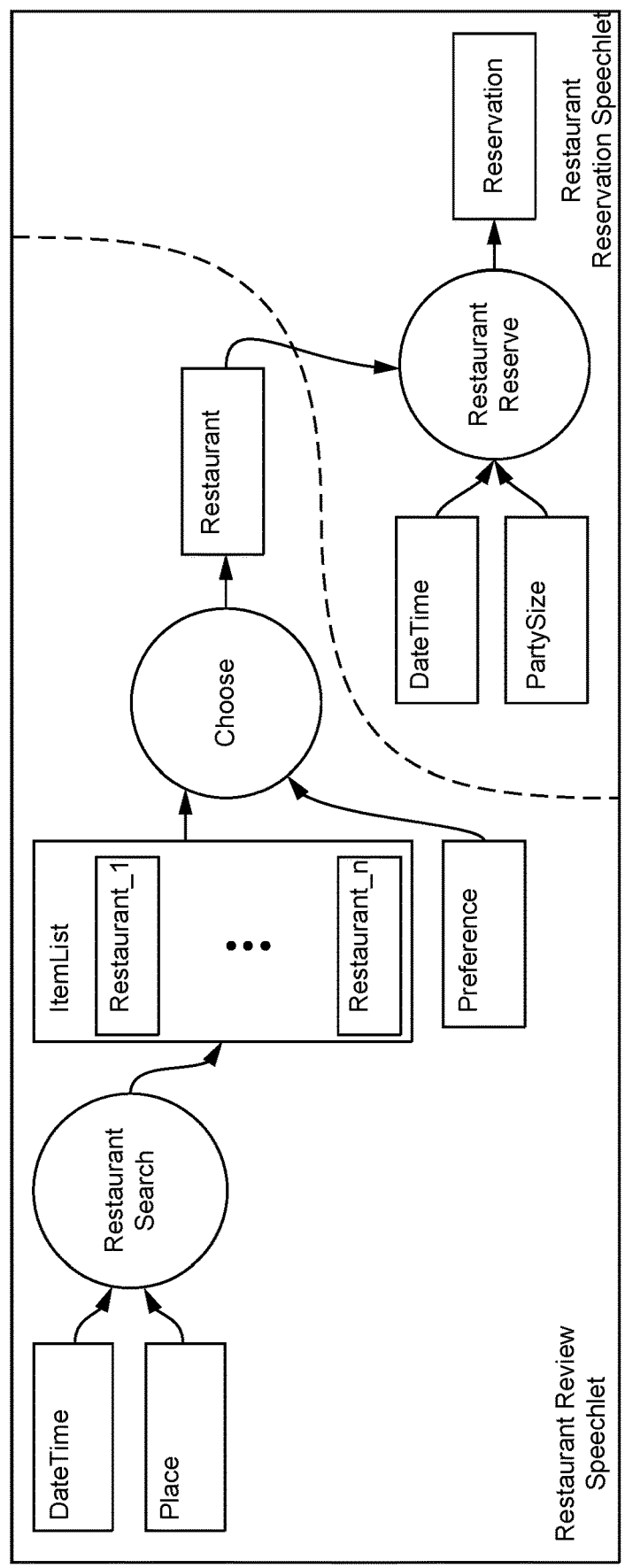
FIG. 12 illustrates an example of using a review speechlet to complete a reserve action according to embodiments of the present disclosure.

FIG. 12 illustrates an example of how two speechlets may interact and how one speechlet may use the output data of another speechlet to perform an action. As illustrated in FIG. 12, a restaurant reservation speechlet may be configured to perform a restaurant reserve action by taking in three input data points, restaurant type data point, datetime type data, and partysize type data. The restaurant reserve action of the speechlet then outputs reservation data. If, however, an input utterance is received that indicates a request to make a restaurant reservation and the action manager 275 is able to obtain datatime data and partysize data (either from the utterance itself or from user preference data, calendar data, a prompt to/response from the user, or the like), a name of a restaurant is still needed. The action manager 275 may be able to determine that the a particular restaurant review speechlet can output a restaurant name by executing two actions, first a restaurant search action using period data and place data and outputting a restaurant list and a second choose action inputting the restaurant list and preference data (for example cuisine type preference data). The action manager 275 may then, in order to obtain a restaurant, select and invoke the restaurant review speechlet. The action manager 275 may select the particular restaurant review speechlet for a number of different reasons including high ratings for the speechlet, user affinity for the speechlet, or the like. The action manager 275 may then send the restaurant review speechlet the datetime information for the restaurant search action and may obtain location information from the user's device to send the restaurant review speechlet for the place data. The action manager 275 may also send the restaurant review speechlet a user cuisine preference that the action manager 275 obtained from user preference data, for example stored in user profile storage 270.

The restaurant review speechlet may then take the period data and the place data to execute the restaurant search action to obtain the restaurant list. The restaurant review speechlet may then take the restaurant list and the preference data received from the action manager 275 to output a name of a restaurant (or restaurant ID) to the action manager 275. The action manager 275 may take the restaurant name/ID and send that (along with the datetime and partysize data) to the restaurant reservation speechlet which then outputs reservation data. The action manager 275 may then output some indication of the reservation to the user (for example through device 110a and/or 110b), may add the reservation to the user's calendar, or perform other operations with the reservation data. Thus, while an utterance may call for a specific action (which may be called the primary action) that may be executable by a certain speechlet component (which may be referred to as a primary speechlet component), if insufficient data is available to execute the specific action, the action manager 275 may communicate with other speechlet components (which may be referred to as intermediate speechlet components) to perform intermediate actions that may (either individually or in combination) result in the output of data usable by the primary speechlet component to execute the specific action.

As may be appreciated, there may be many ways for an action manager 275 to invoke intermediate speechlets to obtain data to execute a primary action. For example, if many restaurant review speechlets are available to the system, the action manager 275 may select from different restaurant review speechlets to obtain a restaurant selection in the example of FIG. 12. Depending on the user's information, the action manager 275 may select a different restaurant review speechlet for a first user than for a second user.

FIG. 13 illustrates how a speech processing system may select different speechlets to execute the same command for different users depending on user data such as user preference data. In the example of FIG. 13, the system may receive process an utterance of "get me a dinner reservation" differently for different users. In one aspect, the goal of the action manager 275 (for example using the action manager model 975) may be to select a path among speechlets to execute the first action in a way that maximizes what the system expects to be the user's satisfaction as relates to the user and the user's history. In the examples of FIG. 13, the system may have obtained date/time data and partysize data like the example of FIG. 12 (either in the utterance or using other data associated with the user) but the system may need to obtain the name of a restaurant in order to complete the reservation action.

The action manager 275 may use the relationships of the data types and actions to navigate a virtual graph (or representative data structure) to find a highest scoring path from an entry node representing initial processing to an exit node, representing a point at which the action is completed (in the example of FIG. 13, a node at which reservation data is available).

The action manager 275 may thus receive NLU result data that includes an indication of a desire to obtain a restaurant reservation. The action manager 275 may thus start an analysis of the next steps at a node 1302 and may determine the best path to get to node 1314, which represents a reservation being available. In the example of FIG. 13, the action manager 275 may select between three recommendation speechlets (represented by nodes 1304, 1306 and 1308) and two reservation speechlets (represented by nodes 1310 and 1312).

If, during runtime, a first user (Customer A) is the user who spoke the utterance, the system will take in the data related to Customer A and will process that data using the action manager 275, for example as illustrated in FIG. 10 and discussed above. Certain information may be unavailable in the utterance (e.g., a restaurant name as in the example of FIG. 12) so the action manager 275 may determine a way to obtain the information needed to execute the reservation action. The action manager 275 may or may not have yet selected an actual reservation speechlet, but may be aware of the data needed to execute the reservation action. Because Customer A has exhibited a preference for recommendation speechlet 1, the action manager 275 may process the NLU result data for Customer A and may determine that paths through the graph that interact with recommendation speechlet 1 (node 1304) should be weighted higher to reflect Customer A's preference. The action manager 275 may thus select a path from node 1302 to node 1304 and may pass data to recommendation speechlet 1 needed for recommendation speechlet 1 to get the data needed to make the reservation. At that point, the state of the dialog after recommendation speechlet 1 may reflect that the best path to the recommendation (node 1314) is by using reservation speechlet 1 (which may have a higher satisfaction rating, may be able to more easily use the data available during the dialog, or may be selected by the action manager 275 for a variety of reasons). Thus the action manager 275 may then pass the data output by recommendation speechlet 1 to reserve speechlet 1, which then outputs the reservation.

A different approach may be used for Customer B. Because Customer B has exhibited a preference for recommendation speechlet 3, the action manager 275 may process the NLU result data for Customer B and may determine that paths through the graph that interact with recommendation speechlet 3 (node 1308) should be weighted higher to reflect Customer B's preference. The action manager 275 may thus select a path from node 1302 to node 1308 and may pass data to recommendation speechlet 3 needed for recommendation speechlet 3 to get the data needed to make the reservation. At that point, the state of the dialog after recommendation speechlet 3 may also reflect that the best path to the recommendation (node 1314) is by using reservation speechlet 1. Thus the action manager 275 may then pass the data output by recommendation speechlet 3 to reserve speechlet 1, which then outputs the reservation.

The action manager 275 may also take alternate actions from the one indicated in the utterance depending on the data that presents itself during the dialog. For example, if a user request the system to "get me a dinner reservation at the best rated restaurant in the city," but the action manager 275 determines that the best rated restaurant (according to a restaurant review speechlet) is one that cannot be reserved using an available reservation speechlet, the system may return to the user an indication that the action is not executable without further action from the user and/or may determine that an alternate action should be performed, for example opening up a communication between device 110 and the restaurant itself (e.g., calling the restaurant's telephone number) so the user can make the reservation. This may be performed using the hierarchical structure of actions of the action catalog 370, where a restaurant reserve action may have several leaves including a reserve-by-speechlet leaf, a reserve-by-phone leaf, or the like. The system may determine the reserve-by-speechlet action is unavailable so the system attempts the reserve-by-phone action to open a call between the user's device and the restaurant.

One or more models implemented by components of the system (such as action manager 275, action manager model 975, or other components) may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. Such techniques may be used in training the action manager model 975 as described above in reference to FIG. 9.

FIG. 14 is a block diagram conceptually illustrating a user device 110 that may be used with the system. FIG. 15 is a block diagram conceptually illustrating example components of a remote device, such as the server(s) 120, which may assist with ASR processing, NLU processing, or command processing. Multiple servers 120 may be included in the system, such as one or more servers 120 for performing ASR, one or more servers 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1404/1504), which may each include a central processing unit (CPU) for processing data and computer-readable instructions, and a memory (1406/1506) for storing data and instructions of the respective device. The memories (1406/1506) may individually include volatile random access memory (RAM), non-volatile read only memory (ROM), non-volatile magnetoresistive memory (MRAM), and/or other types of memory. Each device (110/120) may also include a data storage component (1408/1508) for storing data and controller/processor-executable instructions. Each data storage component (1408/1508) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1402/1502).

Computer instructions for operating each device (110/120) and its various components may be executed by the respective device's controller(s)/processor(s) (1404/1504), using the memory (1406/1506) as temporary "working" storage at runtime. A device's computer instructions may be stored in a non-transitory manner in non-volatile memory (1406/1506), storage (1408/1508), or an external device(s). Alternatively, some or all of the executable instructions may be embedded in hardware or firmware on the respective device in addition to or instead of software.

Each device (110/120) includes input/output device interfaces (1402/1502). A variety of components may be connected through the input/output device interfaces (1402/1502), as will be discussed further below. Additionally, each device (110/120) may include an address/data bus (1424/1524) for conveying data among components of the respective device. Each component within a device (110/120) may also be directly connected to other components in addition to (or instead of) being connected to other components across the bus (1424/1524).

Referring to FIG. 14, the device 110 may include input/output device interfaces 1402 that connect to a variety of components such as an audio output component such as a speaker 1412, a wired headset or a wireless headset (not illustrated), or other component capable of outputting audio. The device 110 may also include an audio capture component. The audio capture component may be, for example, a microphone 1420 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1416 for displaying content.

Via antenna(s) 1414, the input/output device interfaces 1402 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment. The I/O device interface (1402/1502) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (1402/1502), processor(s) (1404/1504), memory (1406/1506), and/or storage (1408/1508) of the device(s) 110 and server(s) 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are exemplary, and may be located as a stand-alone device or may be included, in whole or in part, as a component of a larger device or system.

As illustrated in FIG. 16, multiple devices (110a-110g, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection and display device 110f, and/or a smart TV 110g may be connected to the network(s) 199 through a wireless service provider, over a WiFi or cellular network connection, or the like. Other devices are included as network-connected support devices, such as the server(s) 120, speechlet server(s) 125, or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments. Further, although the description above illustrates the system operations with regard to server/device model a local device configured with the appropriate computing components may execute the above operations without communicating with a server.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a speech-capture device, audio data corresponding to an utterance, the speech-capture device associated with a user profile;
   performing automatic speech recognition on the audio data to determine text data;
   performing natural language processing on the text data to determine NLU output data including at least intent data corresponding to a request to execute a first action;
   determining that execution of the first action is associated with multiple speechlet components;
   identifying a trained model configured to select a speechlet component of the multiple speechlet components;
   processing a feature vector representing the intent data using the trained model to identify a first speechlet component configured to execute the first action using a first type of data;
   identifying history data indicating at least one previous speechlet component activated with respect to a previous request associated with the user profile;
   identifying preference data indicating at least one preference for certain speechlet components for the previous request associated with the user profile;
   processing the history data, the preference data, and an indicator of the request using the trained model to determine a first score corresponding to a second speechlet component configured to output the first type of data and a second score corresponding to a third speechlet component configured to output the first type of data;
   determining the first score is greater than the second score;
   determining the second speechlet component is configured to use a second type of data to output the first type of data;
   determining that profile data corresponding to the second type of data is stored in the user profile;
   sending the profile data to the second speechlet component;
   receiving, from the second speechlet component, response data corresponding to the first type of data;
   sending, to the first speechlet component, the response data; and
   causing the first speechlet component to execute the first action using the response data.

2. The computer-implemented method of claim 1, further comprising:
   receiving video data corresponding to a time of the utterance;
   processing the video data and audio data using a user satisfaction component to determine a third score corresponding to an estimated user satisfaction corresponding to the utterance;
   processing the third score using the trained model to determine the first score;
   identify, in the trained model, a first weight corresponding to the first speechlet component;
   determine, based on the third score, a second weight corresponding to the first speechlet component; and
   store a revised trained model including the second weight.

3. The computer-implemented method of claim 1, wherein the first speechlet component is incorporated within a natural language processing system and is configured to:
   input at least a portion of the NLU output data; and
   determine output data corresponding to the first action.

4. A system comprising:
   at least one processor; and
   at least one memory including instructions that, when executed by the at least one processor, cause the system to:
   receive first input data associated with a user profile;
   determine a first action associated with the first input data;
   determine, from among a plurality of speechlet components, a first speechlet component configured to execute the first action using at least a first type of data;
   determine the first type of data is absent from the first input data;
   based at least in part on the first speechlet component being configured to execute the first action using the first type of data and based at least in part on the first type of data being absent from the first input data, determine another speechlet component is to be used to obtain the first type of data;
   receive sentiment data corresponding to the first input data;
   receive history data indicating at least one speechlet component previously executed with respect to the user profile;
   receive preference data indicating at least one preferred speechlet component corresponding to the user profile;

determine, using the first type of data, the sentiment data, the history data, and the preference data, a second speechlet component from the plurality of speechlet components, the second speechlet component configured to output data corresponding to the first type of data usable by the first speechlet component to execute the first action;

determine that the second speechlet component is configured to execute a second action using a second type of data;

send, to the second speechlet component, second input data corresponding to the second type of data;

receive, from the second speechlet component, third input data corresponding to the first type of data usable by the first speechlet component to execute the first action, the third input data being output by the second speechlet component; and send, to the first speechlet component, the third input data to execute the first action using the third input data.

5. The system of claim 4, wherein further instructions, when executed by the at least one processor, further cause the system to:

receive, from a device, audio data corresponding to an utterance; and perform automatic speech recognition on the audio data to determine the first input data.

6. The system of claim 4, wherein:

the first speechlet component is configured to execute the first action further using data of a third type, and further instructions, when executed by the at least one processor, further cause the system to:

process the history data, the preference data, and the data of the third type to determine a first score corresponding to a third speechlet component configured to output data of the third type and a second score corresponding to a fourth speechlet component configured to output data of the third type;

determine the first score is greater than the second score;

determine the third speechlet component is configured to use data of a fourth type to execute a third action to determine output data of the third type;

identify fourth input data corresponding to the fourth type;

send, to the third speechlet component, the fourth input data and an instruction to execute the third action;

receive, from the third speechlet component, fifth input data corresponding to the third type; and send, to the first speechlet component, the fifth input data.

7. The system of claim 4, wherein further instructions, when executed by the at least one processor, further cause the system to:

identify the history data corresponding to the user profile associated with the first input data;

determine the history data includes the second input data corresponding to the second type; and select the second input data from the history data.

8. The system of claim 6, wherein further instructions, when executed by the at least one processor, further cause the system to:

determine that further input is needed regarding data of the fourth type;

determine prompt text requesting data of the fourth type;

perform text-to-speech (TTS) processing on the prompt text to determine output audio data;

send the output audio data to a device;

receive, from the device, second audio data; and perform speech processing on the second audio data to determine the third input data.

9. The system of claim 4, wherein the first speechlet component is configured to execute the first action further using at least data of a third type, and further instructions, when executed by the at least one processor, further cause the system to determine that a portion of the first input data corresponds to the third type.

10. The system of claim 4, wherein further instructions, when executed by the at least one processor, further cause the system to:

receive, from the first speechlet component, output data corresponding to the first action;

send, to a device, an indication of the output data;

determine feedback data corresponding to a reaction of the output data; and update a trained model using at least the feedback data.

11. The system of claim 10, wherein further instructions, when executed by the at least one processor, further cause the system to:

identify, in the trained model, a first weight corresponding to the first speechlet component;

determine, based on the feedback data, a second weight corresponding to the first speechlet component; and store a revised trained model including the second weight.

12. A computer-implemented method comprising:

receiving first input data associated with a user profile;

determining a first action associated with the first input data;

determining, from among a plurality of speechlet components, a first speechlet component configured to execute the first action using at least a first type of data;

determining the first type of data is absent from the first input data;

based at least in part on the first speechlet component being configured to execute the first action using the first type of data and based at least in part on the first type of data being absent from the first input data, determining another speechlet component is to be used to obtain the first type of data;

receiving sentiment data corresponding to the first input data;

receiving history data indicating at least one speechlet component previously executed with respect to the user profile;

receiving preference data indicating at least one preferred speechlet component corresponding to the user profile;

determining, using the first type of data, the sentiment data, the history data, and the preference data, a second speechlet component from the plurality of speechlet components, the second speechlet component configured to output data corresponding to the first type of data usable by the first speechlet component to execute the first action;

determining that the second speechlet component is configured to execute a second action using a second type of data;

sending, to the second speechlet component, second input data corresponding to the second type of data;

receiving, from the second speechlet component, third input data corresponding to the first type of data usable by the first speechlet component to execute the first action, the third input data being output by the second speechlet component; and sending, to the first speechlet component, the third input data to execute the first action using the third input data.

13. The computer-implemented method of claim 12, wherein the first speechlet component is configured to execute the first action further using data of a third type, and the method further comprises:
processing the history data, the preference data, and the data of the third type to determine a first score corresponding to a third speechlet component configured to output data of the third type and a second score corresponding to a fourth speechlet component configured to output data of the third type;
determining the first score is greater than the second score;
determining the third speechlet component is configured to use data of a fourth type to execute a third action to determine output data of the third type;
identifying fourth input data corresponding to the fourth type;
sending, to the third speechlet component, the fourth input data and an instruction to execute the third action;
receiving, from the third speechlet component, fifth input data corresponding to the third type; and
sending, to the first speechlet component, the fifth input data.

14. The computer-implemented method of claim 12, further comprising:
identifying the history data corresponding to the user profile associated with the first input data;
determining the history data includes the second input data corresponding to the second type; and
selecting the second input data from the history data.

15. The computer-implemented method of claim 13, further comprising:
determining that further input is needed regarding data of the fourth type;
determining prompt text requesting data of the fourth type;
performing text-to-speech (TTS) processing on the prompt text to determine output audio data;
sending the output audio data to a device;
receiving, from the device, second audio data; and
performing speech processing on the second audio data to determine the second input data.

16. The computer-implemented method of claim 12, wherein the first speechlet component is configured to execute the first action further using at least data of a third type, and the method further comprises determining that a portion of the first input data corresponds to the third type.

17. The computer-implemented method of claim 12, further comprising:
receiving, from the first speechlet component, output data corresponding to the first action;
sending, to a device, an indication of the output data;
determining feedback data corresponding to a reaction of the output data; and
updating a trained model using at least the feedback data.

18. The computer-implemented method of claim 17, further comprising:
identifying, in the trained model, a first weight corresponding to the first speechlet component;
determining, based on the feedback data, a second weight corresponding to the first speechlet component; and
storing a revised trained model including the second weight.

19. The system of claim 4, wherein the first input data corresponds to a first user input of a dialog, and wherein further instructions, when executed by the at least one processor, further cause the system to:
receive dialog data corresponding to at least a second user input received prior to the first user input, the dialog data including at least entity data associated with the second user input and action data associated with the second user input; and
determine the second speechlet component further using the dialog data.

20. The computer-implemented method of claim 12, wherein the first input data corresponds to a first user input of a dialog, and the method further comprises:
receiving dialog data corresponding to at least a second user input received prior to the first user input, the dialog data including at least entity data associated with the second user input and action data associated with the second user input; and
determining the second speechlet component further using the dialog data.

* * * * *